(12) United States Patent
Swanson et al.

(10) Patent No.: US 8,751,193 B2
(45) Date of Patent: Jun. 10, 2014

(54) POSITIONING DEVICE WITH EXTENSIBLE CORD AND METHOD

(75) Inventors: David W. Swanson, Fallbrook, CA (US); William Robert Swanson, Fallbrook, CA (US)

(73) Assignee: Delta II, I.P., Stockton, CA (US)

(*) Notice: Subject to any disclaimer, the term of this patent is extended or adjusted under 35 U.S.C. 154(b) by 469 days.

(21) Appl. No.: 12/737,485

(22) PCT Filed: Sep. 29, 2009

(86) PCT No.: PCT/US2009/005368
§ 371 (c)(1),
(2), (4) Date: Jan. 18, 2011

(87) PCT Pub. No.: WO2010/147571
PCT Pub. Date: Dec. 23, 2010

(65) Prior Publication Data
US 2011/0131008 A1 Jun. 2, 2011

Related U.S. Application Data

(63) Continuation-in-part of application No. 12/214,585, filed on Jun. 20, 2008, now Pat. No. 7,665,223, and a continuation-in-part of application No. PCT/US2009/003690, filed on Jun. 18, 2009.

(51) Int. Cl.
*G01B 5/008* (2006.01)
*G01B 3/10* (2006.01)
*G06F 19/00* (2011.01)
*G06F 17/40* (2006.01)

(52) U.S. Cl.
CPC ...... *G01B 5/008* (2013.01); *G01B 3/10* (2013.01); *G06F 19/00* (2013.01); *G06F 17/40* (2013.01)
USPC .............. 702/152; 33/756; 33/761; 702/33; 702/150; 702/164; 708/200

(58) Field of Classification Search
CPC .............. G01B 3/00; G01B 3/02; G01B 3/10; G01B 3/81084; G01B 5/00; G01B 5/004; G01B 5/008; G01B 5/14; G01B 21/00; G01B 21/02; G01B 21/04; G01B 21/16; G01B 2003/00; G01B 2003/02; G01B 2003/10; G01B 2003/1041; G01D 21/00; G06F 11/00; G06F 11/30; G06F 11/32; G06F 17/00; G06F 17/40; G06F 19/00
USPC ........... 33/501, 503, 504, 556, 666, 700, 701, 33/702, 706, 707, 708, 709, 732, 755, 756, 33/757, 759, 760, 761, 762, 763, 769, 772, 33/773; 73/432.1, 865.8, 866.3; 178/2 R, 178/18.01; 356/138, 614; 702/1, 33, 35, 36, 702/127, 150, 152, 155, 158, 163, 164, 187, 702/189; 703/1; 708/100, 105, 200
IPC .............. G01B 3/00, 3/02, 3/10, 3/81084, 5/00, G01B 5/004, 5/008, 5/14, 21/00, 21/02, 21/04, G01B 21/16, 2003/00, 2003/02, 2003/10, G01B 2003/1041; G01D 21/00; G06F 11/00, G06F 11/30, 11/32, 17/00, 17/40, 19/00
See application file for complete search history.

(56) References Cited

U.S. PATENT DOCUMENTS 2,906,179 A * 9/1959 Bower .............................. 409/80
(Continued)

*Primary Examiner* — Edward Cosimano
(74) *Attorney, Agent, or Firm* — Palomar Patent; Calif Tervo

(57) ABSTRACT

A positioning device includes a computer including a stored design file, such as a CAD file, for positioning a selected portion of the design on a workpiece. In a first embodiment, a base unit houses an extensible cable including a free end for placement by a user at a design point on the workpiece. A turn carriage freely rotates about a turn axis to follow cable movement. In output mode, the user is directed to move the cable free end toward the portion of the design and a cable tensioning motor adjusts the tension in the cable sufficiently to indicate when cable free end is at a distance to the portion of the design. Other embodiments include: a turn carriage servoed motor for rotating the turn carriage to follow the cable; and a pitch carriage and servoed motor for rotating the pitch carriage for following the cable.

22 Claims, 24 Drawing Sheets

(56) References Cited

U.S. PATENT DOCUMENTS

| | | | |
|---|---|---|---|
| 3,037,286 A * | 6/1962 | Bower | 33/1 SB |
| 6,006,978 A | 12/1999 | Swanson | |
| 6,630,923 B2 * | 10/2003 | Sato | 345/156 |
| 6,785,973 B1 | 9/2004 | Janssen | |
| 7,395,609 B2 | 7/2008 | Powell | |
| 7,665,223 B2 * | 2/2010 | Swanson et al. | 33/756 |
| 7,841,246 B2 * | 11/2010 | Swanson et al. | 73/862.44 |
| 8,220,167 B2 * | 7/2012 | Swanson et al. | 33/1 G |
| 8,418,373 B2 * | 4/2013 | Swanson et al. | 33/1 G |
| 2001/0038376 A1 * | 11/2001 | Sato | 345/156 |
| 2008/0072443 A1 * | 3/2008 | Powell | 33/503 |
| 2009/0313844 A1 * | 12/2009 | Swanson et al. | 33/756 |
| 2010/0089175 A1 * | 4/2010 | Swanson et al. | 73/862.44 |
| 2011/0119936 A1 * | 5/2011 | Swanson et al. | 33/228 |
| 2011/0126416 A1 * | 6/2011 | Swanson et al. | 33/527 |

* cited by examiner

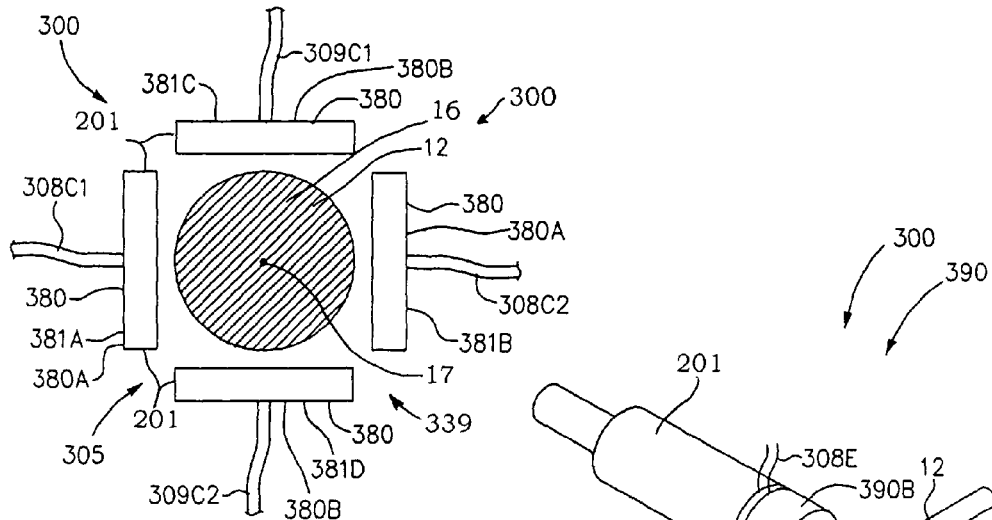
FIG. 9
FIG. 11
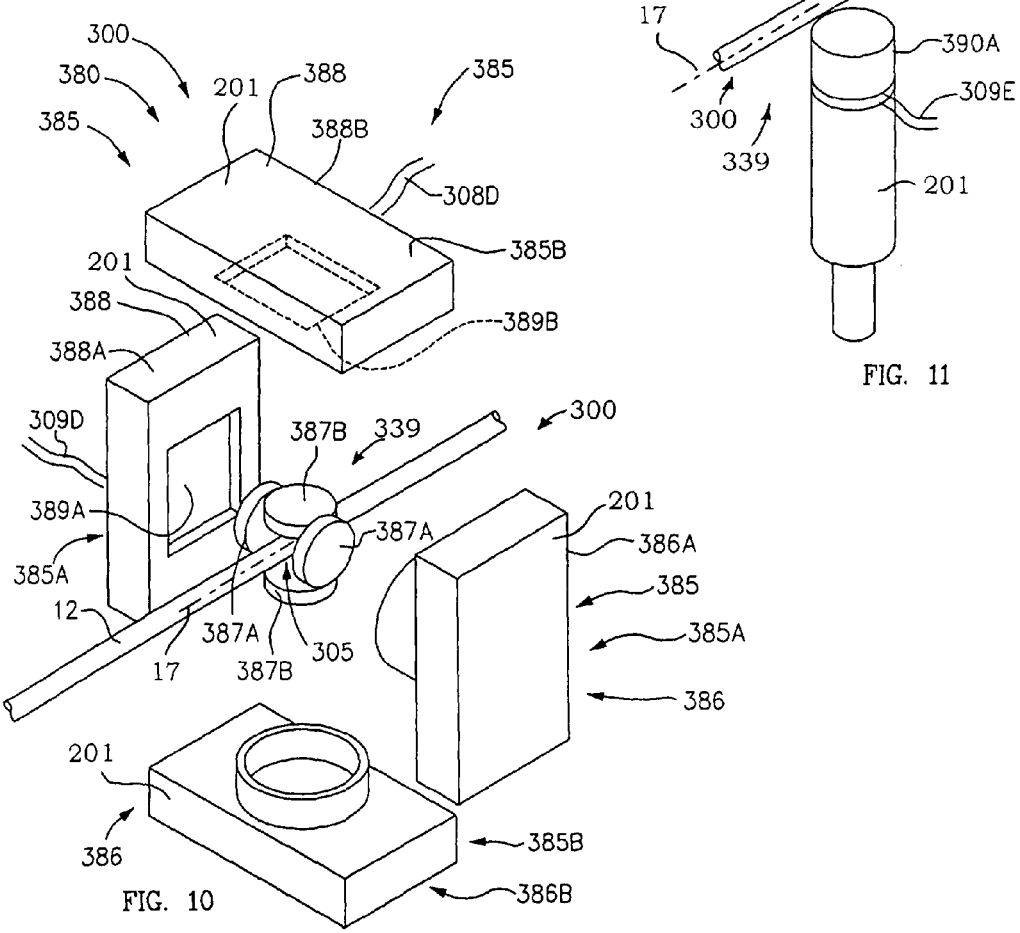
FIG. 10

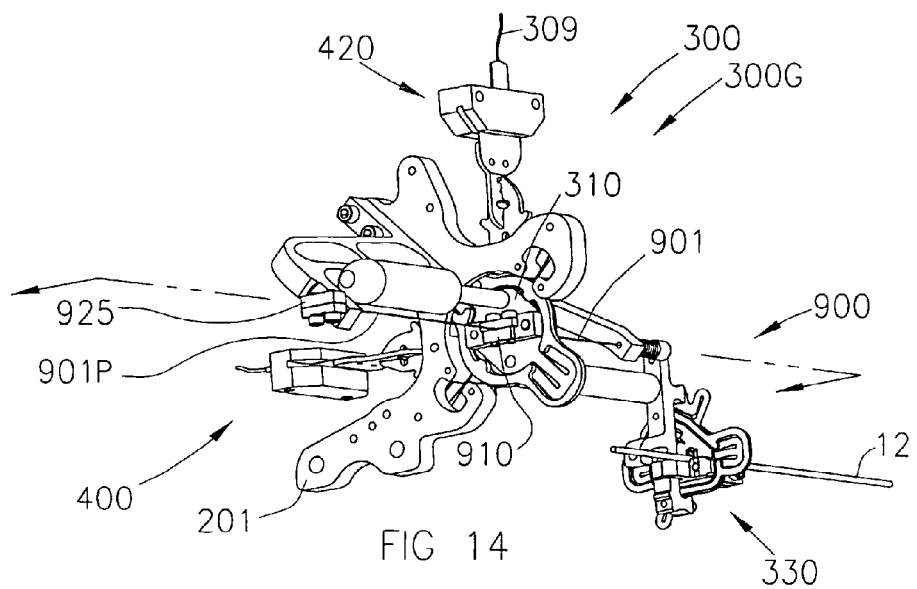
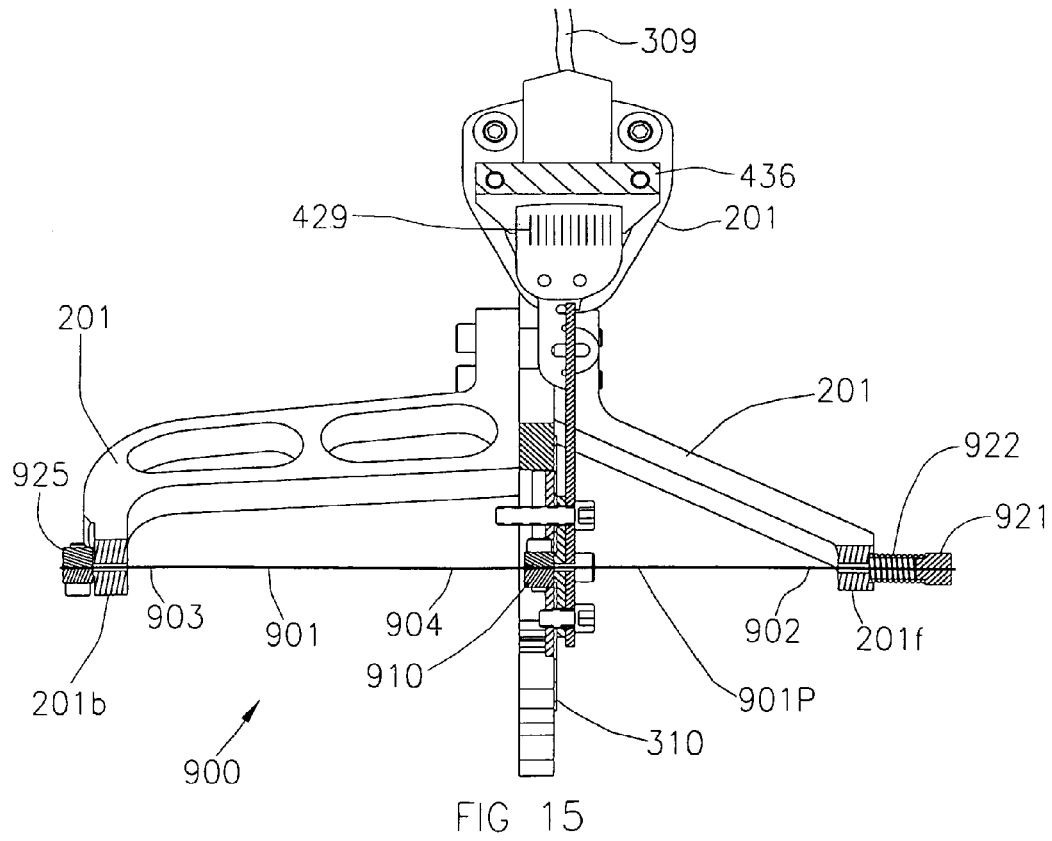

POSITIONING DEVICE WITH EXTENSIBLE CORD AND METHOD

CROSS-REFERENCE TO RELATED APPLICATIONS

This application is a continuation-in-part and claims benefit of U.S. application Ser. No. 12/214,585, filed Jun. 20, 2008 titled Measuring Device with Extensible Cord and Method, now U.S. Pat. No. 7,665,223, and PCT Application Number PCT/US2009/003690, filed Jun. 18, 2009 titled Measuring Device with Extensible Cord and Method.

FIELD OF THE INVENTION

This invention relates in general to positioning devices and more specifically involves a positioning device with an extensible cord having a free end, the cord free end for positioning a design on a workpiece.

BACKGROUND OF THE INVENTION

Conventional devices for placing a design, such as a CAD that is retained in a computer, on a workpiece include laser output devices. The design to be positioned my be a single point or multiple spaced points, such as placement of a bore hole or holes, a continuous curve, such as drawing a line, or a three dimensional surface.

However, laser output devices are extremely expensive, are very sensitive to shocks and dust, and have limited accuracy on many surfaces. Therefore, there are many applications where they are not suitable for use.

Additionally, laser devices must typically be positioned at a known location and orientation relative to the work piece in order to position the design on the workpiece. This typically requires the laser device to be used in a fixture with the workpiece. However, there are many applications, particularly one-time applications, in which it is highly desirable position the design without the use of a fixture.

SUMMARY OF THE INVENTION

The invention is a positioning device including a computer including a stored design file, such as a CAD file, for positioning a selected portion of the design on a workpiece.

In first embodiment, the device generally comprises a base unit having a base. The base unit houses an extensible cable including a free end for placement by a user at a design point on the workpiece. A turn carriage, rotationally mounted on the base so as to rotate about a turn axis, includes a main datum passage and an incoming cable passage between the main datum passage and the cable free end providing confined passage of the midsection of the cable. The cable has an alignment position when the local longitudinal axis of the cable in the incoming datum passage is radially aligned with the main datum passage.

A turn carriage measuring means measures the rotational position or change of rotational position of the turn carriage and a cable measuring means is coupled to the cable for measuring the length or change of length of the cable. A cable tensioning motor adjusts the force required to move the cable free end away from the base unit. Cable direction means directs a user to move the cable free end toward the portion of the design on the workpiece. The device has an output mode for positioning the portion of the design on a workpiece wherein: the turn carriage freely rotates to the alignment position responsive to force of the cable on the incoming datum passage; and the computer is programmed, responsive to the turn carriage measuring means, for directing the cable direction means to direct the user to move the cable free end toward the portion of the design and; responsive to the cable measuring means, for directing the cable tensioning motor to adjust the tension in the cable sufficiently to indicate when cable free end is at a distance to the portion of the design.

The coming cable passage may include pitch measuring means for measuring the pitch angle or change of pitch angle of the cable.

Another embodiment of the device includes a turn carriage servoed motor for rotating the turn carriage to follow the cable. Another embodiment includes a pitch carriage and pitch carriage servoed motor for rotating the pitch carriage for following the cable. Alternately, the servoed motors can also be used to position the device at a target position wherein the incoming datum passage and the main datum passage are radially aligned with the portion of the design.

For outputting the design, the device may be placed in a known position and orientation relative to the workpiece, or the device first be used as an input device to measure the relative location and orientation of the workpiece.

Other features and many attendant advantages of the invention will become more apparent upon reading the following detailed description together with the drawings wherein like reference numerals refer to like parts throughout.

BRIEF DESCRIPTION OF THE DRAWINGS

FIG. 9 is a perspective schematic of a second embodiment of the cable angular displacement sensor in the form of contact sensors.

FIG. 10 is a perspective schematic of a third embodiment of the cable angular displacement sensor in the form of optical sensors.

FIG. 11 is a perspective schematic of a fourth embodiment of the cable angular displacement sensor in the form of a magnetic or electromagnetic sensor.

FIG. 14 is a front, top, right side perspective view, similar to FIG. 4B, of an alternate embodiment of the main gimbal thrust support in the form of a wire.

FIG. 15 is a cross sectional view, similar to FIG. 8, of the wire main gimbal thrust support of FIG. 14.

DETAILED DESCRIPTION OF THE INVENTION

Figure 1:
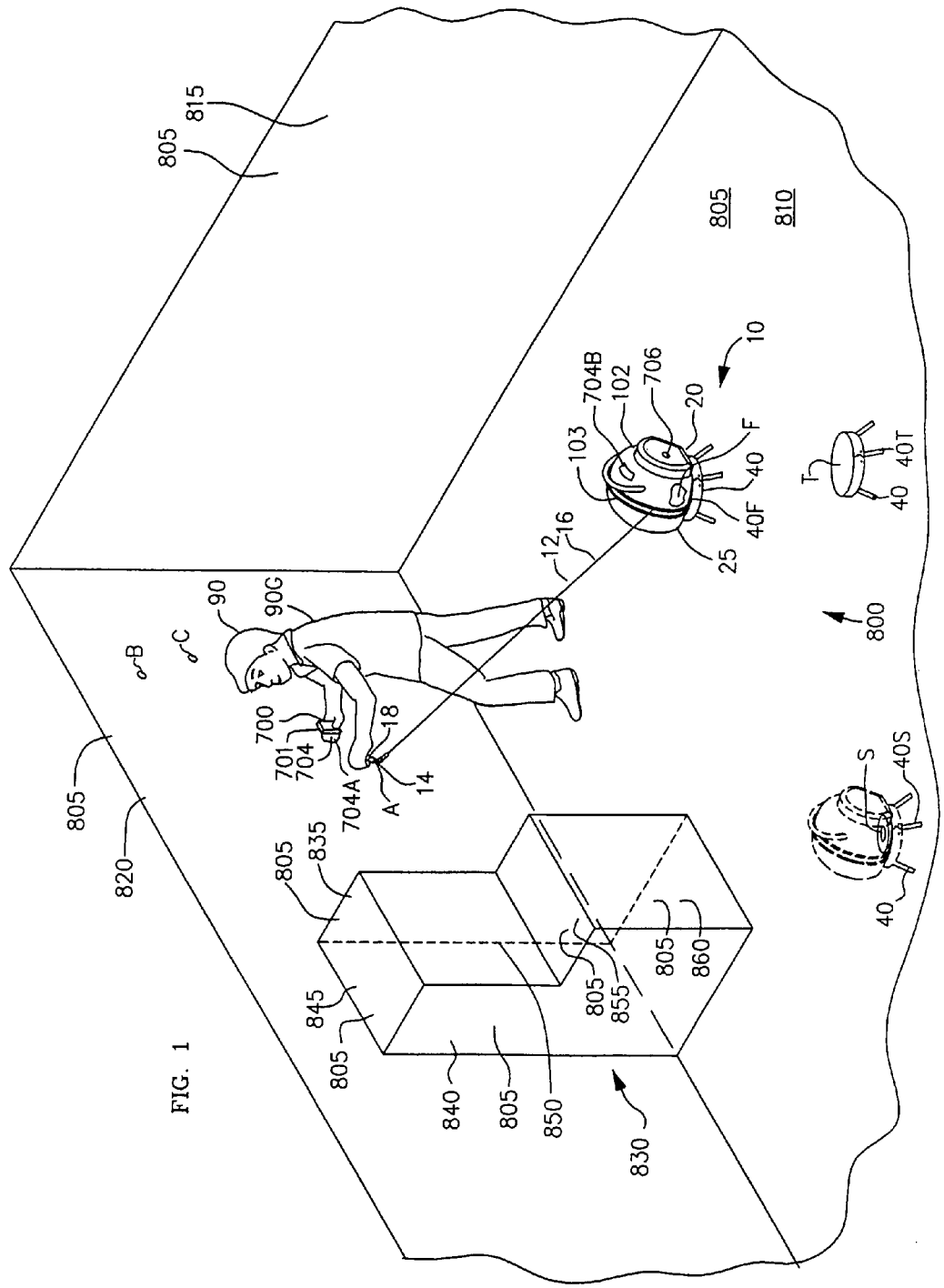
FIG. 1 is a perspective view of a room showing a use of the measuring device of the invention.

With reference now to the drawings, there is shown in FIG. 1 a perspective view of a room 800 showing a use of a first embodiment 10A of the measuring device 10 of the invention. A user 90 uses measuring device 10 to obtain numerical coordinates, such as polar coordinates, of a plurality of points in room 800. By measuring the location of a relatively small number of points in room 800, measuring device 10 can define all of the desired surfaces 805 in three-space for purposes of determining the amount or size of flooring, paint, wall coverings, windows, counter tops, cabinets and other features.

Device 10 may be used in a factory to measure the three-dimensional location of piping, or machinery details, or other generally difficult-to-measure objects.

Surfaces 805 of room 800 include a floor 810, back wall 815, and side wall 820. A hutch 830 abuts side wall 820. Surfaces 805 of hutch 830 include a right side wall 835, a left side wall 840, a top surface 845, an upper front wall 850, a lower surface 855, and a lower front wall 860.

Device 10 generally includes a retractable cable 12 having a midsection 16 and a free end 14; a base unit 20 supporting devices for tracking movement of cable 12 and for measuring the length and direction of cable 12, a computer 700, such as a personal digital assistant (PDA) 701 held by a user 90, and a user interface 704 to computer 700 such as an entry pad 704A on PDA 701 or key pad 704B on base unit 20.

Housing 102 is protective against dirt and damage and defines an orifice 103 for passage of cable 12. As will be explained in greater detail later, housing 102 rotates to follow cable 12 as cable 12 is moved. Base unit 20 is adapted to be firmly supported by a surface. Framework 25 of base unit 20 is firmly supported by a support 40, such as a floor plate placed on the floor or, such as shown in the exemplary embodiment, on a first tripod 40F placed on floor 810. Preferably, base unit 20 is selectively attachable to support 40 for purposes as will be explained.

A user 90, such as grip user 90G, grips a grip 18 attached to cable free end 14 and places free end 14 on a point, such as point A on side wall 820, the location of which is to be measured by device 10. Grip 18 is attached to cable 12 in a manner so as to not introduce a moment to cable 12 so as to keep cable 12 linear. The distance to point A and the direction to point A are measured by measuring devices in housing 102.

One or more computers 700 are used for data input, storage, and processing. In the preferred embodiment shown, grip user 90G uses a hand held computer 700, such as a personal digital assistant (PDA) 701. PDA 701 contains a program adapted for receiving and processing data input. A computer program for performing the functions described herein is readily commercially available or can be written by a programmer reasonably skilled in the art or an existing program can be readily adapted to the specifics of device 10 by a programmer reasonably skilled in the art. Alternatively, a computer 700 may be located in base unit 20 or be a separate unit.

In the exemplary embodiment, grip user 90G enters input on entry pad 704A of PDA 701. PDA 701 and base unit 20 have wireless connectivity, such as radio, such as BLUETOOTH®, and PDA 701 receives the cable measurements from base unit 20. Other wireless connectivity, such as IrDA (infrared), sound, or Wi-Fi could be used. Alternatively, other input and connectivity methods could be used. A separate cable could be used. Input could be transmitted via measuring cable 12. Data connectivity between computer 700, measuring devices, and grip user 90G allows just one person to be able to operate device 10 and measure room 800. A second user, not shown, could communicate with computer 700 in one of the above-described manners or furnish input via port 706 or on entry or key pad 704B on base unit 20.

Figure 13:
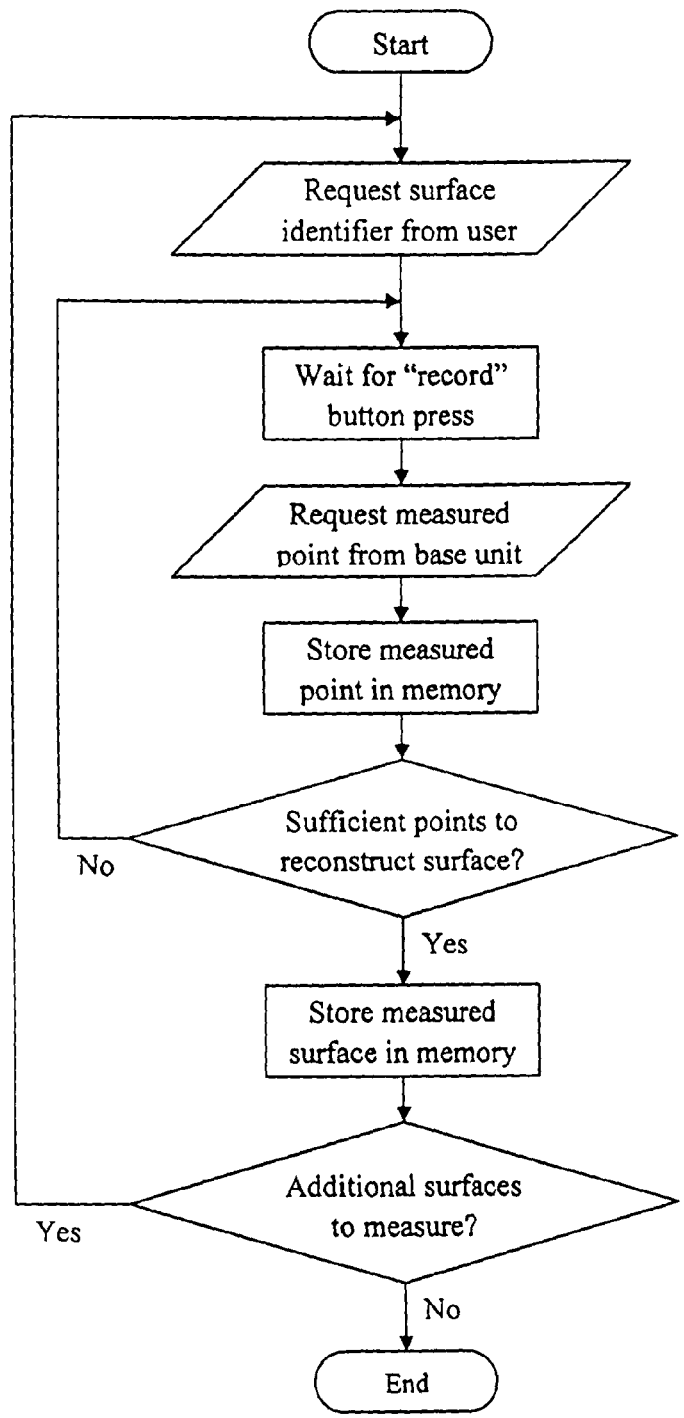
FIG. 13 is a flow chart for measuring a surface.

Turning momentarily to FIG. 13, there is shown a flow chart for taking measurement. A user inputs a surface identifier to identify the surface being measured for associating the measured points with. With cable free end 14 on a point to be measured on the surface, the user presses a "record" button. The measurements are recorded. If more points must be input to reconstruct the surface, then cable free end 14 is moved and additional points are recorded to memory for that surface. If not, then a new surface identifier is entered and points on that surface are measured.

In an exemplary use, user 90 places first tripod 40F firmly on floor 810 and attaches framework 25. The program in IDA 701 is activated for receiving data. Grip user 90G enters an identifier for a surface 805, such as side wall 820, to be measured Grip user 90G enters an identifier for type of surface, for example "planar" for side wall surface 820, places cable free end 14 on a point, such as point A, on side wall 820, and presses a record button on PDA 701. The location of point A is determined by base unit 20 and is transmitted to PDA 701. This procedure is repeated with points B and C. PDA 701 now has in memory three points A, B, C that define a plane, of which side wall surface 820 is a part. The same procedure is used for other surfaces 805. Additional points on any surface 805 may be measured. The gathered data can be processed by computer 700 or sent, such as via port 706 or radio, such as with BLUETOOTH®, to another computer for processing.

From the measured data, imaging software, such as computer aided design (CAD) software reconstructs surfaces 820. Such software is well known in the art. An example is Geomagic Studio from Geomagic, Inc. Another software package for processing point data into three dimensions is RapidFormXOR from INUS Technology, Inc. and Rapidform, Inc.

Other identifiers for type of surface are used for more complex surfaces. For a surface identifier such as "smooth curve", the computer program could "fair" the associated measured points to arrive at the surface configuration. For each surface designation, one or more sub-designations may be used. For example, "edge" or "terminus" is used for designating an edge point or corner point on a surface respectively. For measuring more complex surfaces, a large number of points are measured or a "scan" sub-designation is entered and cable free end 14 is drawn along the surface and points are measured repeatedly If a surface 805 to be measured, such as hutch left end 840, cannot be measured by device 10 while mounted on first tripod 40F, such as because the surface 840 is not in the line of sight from first tripod 40F or cannot reached by cable end 14 from first tripod 40F, then an additional tripod, such as second tripod 40S, is placed in a suitable location for measuring surface 840. Each tripod 40 includes a reference point, such as point F, S or T, the location of which, relative to an attached base unit 20, is known. The location of reference point S on second tripod 40S is measured by device 10 to establish the spatial location of second tripod 40S relative to first tripod 40F. Base unit 20 is detached from first tripod 40F and attached to second tripod 40S. The reference point F on first tripod 40F is measured by base unit 20 on second tripod 40S to establish the angular orientation of base unit 20 on second tripod 40S relative to first tripod 40F. Points are measured from base unit 20 on second tripod 40S.

This tripod jumping pattern can be repeated to measure any surfaces 805. For example, to measure additional points that are not measurable from second tripod 40S, first tripod 40F, or another tripod 40T is moved to a suitable location for measuring the points. Its reference point F at the new location is measured, base unit 20 is detached from second tripod 40S and attached to the moved first tripod 40F, and reference point S of second tripod 40S is measured to establish the relative position of the new location.

If it is desirable to later add a surface 805 to the data or to later improve on or correct measured data from a surface 805, it is not necessary to re-input all of the measured points. Instead, to add a surface 805, base unit 20 is placed, as described above, in a position to both measure the additional surface 805 and to measure a plurality of points on already known surfaces 805. A "re-orientation" entry directs computer 700 to use the next measured points from known surfaces 805 to determine the location and orientation of base unit 20 by triangulation. The additional points or surface 805 can then be measured and added to the previously measured data.

Figure 2:
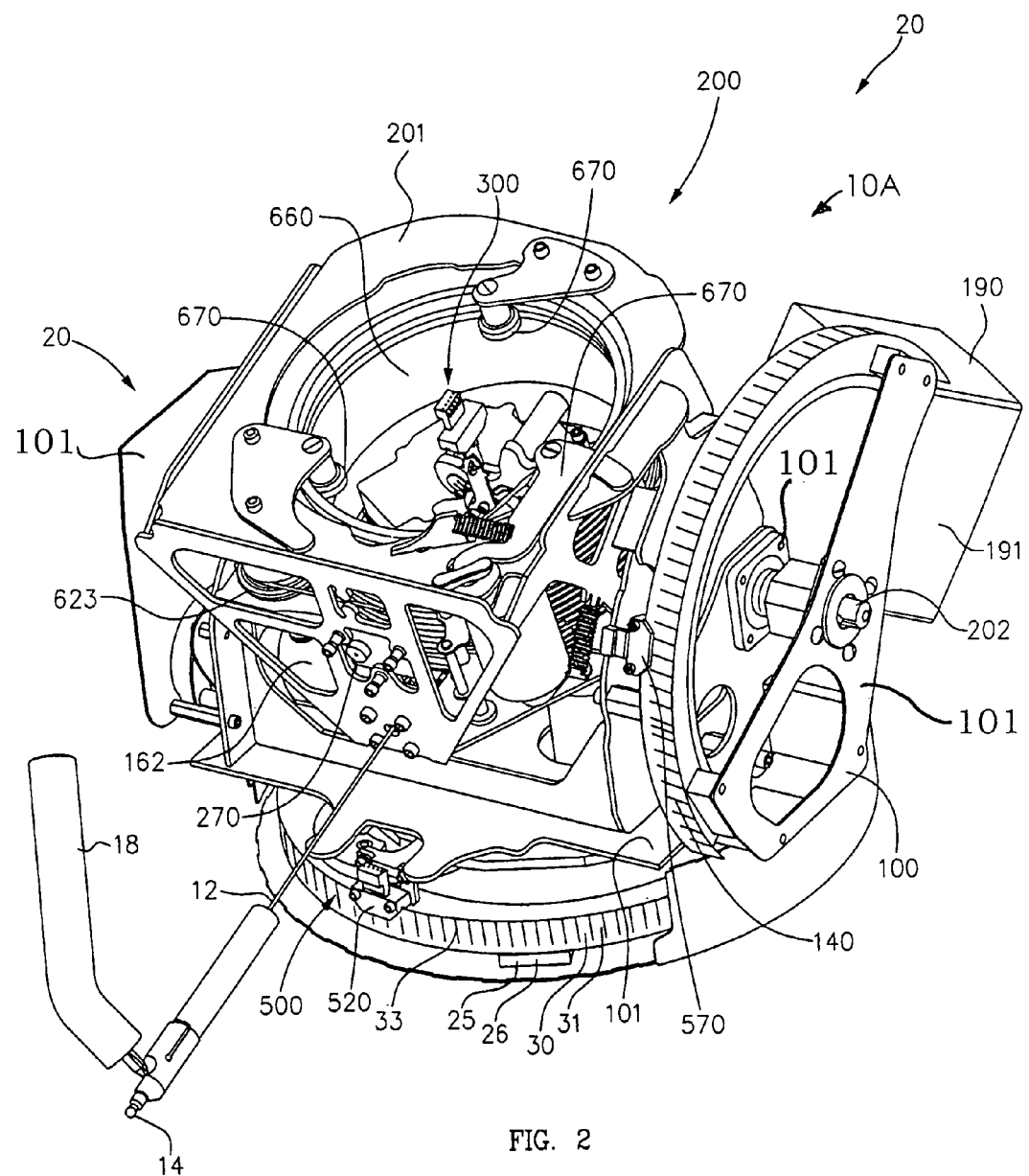
FIG. 2 is a top, front, right side, partially cut away, perspective view of selected elements of the base unit of the device.
Figure 3:
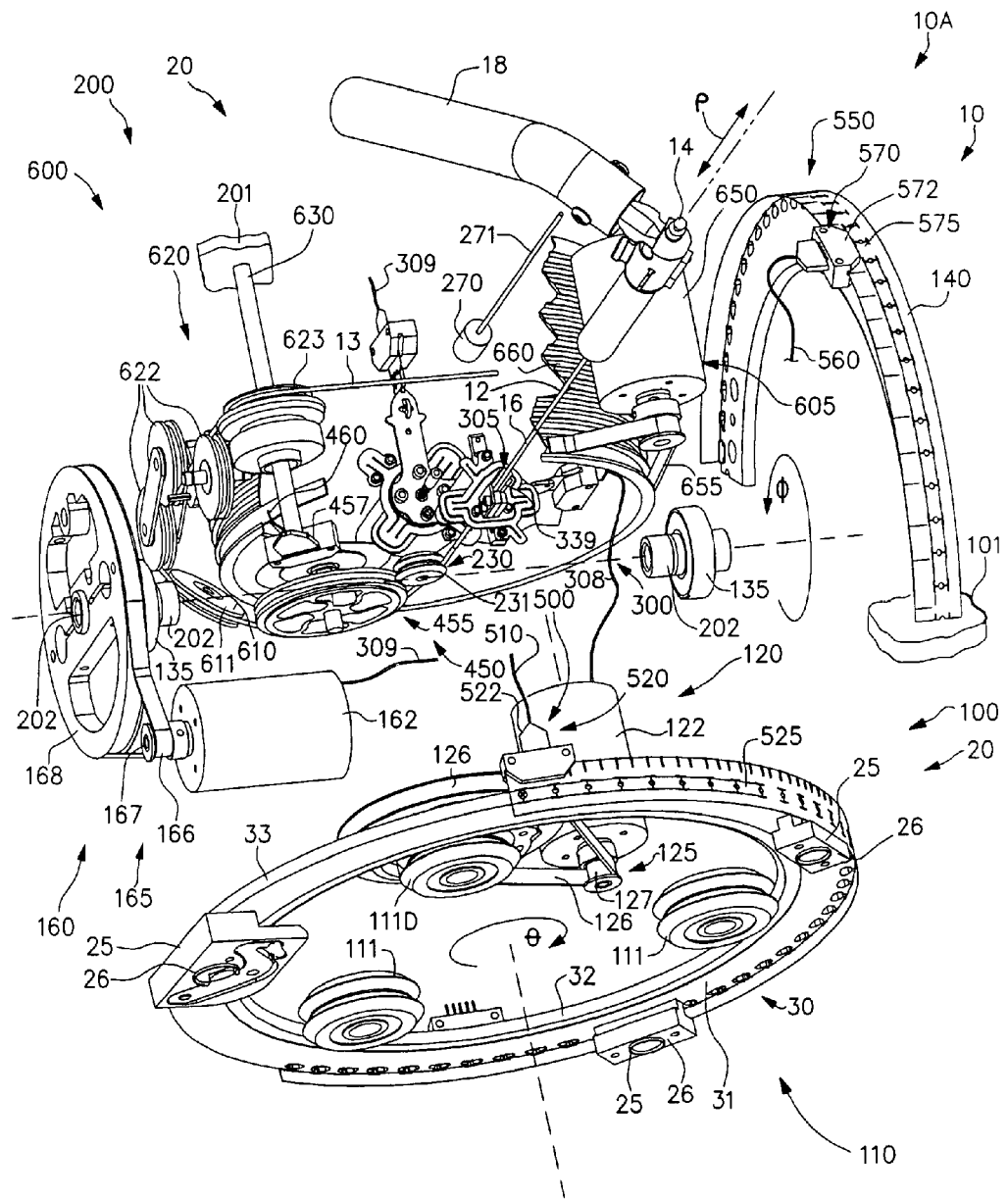
FIG. 3 is a bottom, front, left side, partially cut away, perspective view of selective elements of FIG. 2.

FIG. 2 is a top, front, right side, partly cut away, perspective view of selected elements of the base unit 20 of device 10. FIG. 3 is a bottom, front, left side, perspective view of selected elements of FIG. 2. FIGS. 2 and 3 will be used to explain the overall functions of device 10. Pertinent elements will be later discussed in greater detail. A cable 12 includes a free end 14, a supply end 13, and a midsection 16 therebetween. Free end 14 is for placement on a point, the location of which is to be measured, such as point A on FIG. 1. A grip 18 attached to free end 14 of cable 12 is used, such as by gripping by user 90G, for positioning free end 14 at a point to be measured.

Base Unit 20 generally includes framework 25 for attachment to floor support 40, a base 30 attached to framework 25, a turn carriage 100 rotationally mounted on base 30, and a pitch carriage 200 rotationally mounted on turn carriage 100.

Framework 25 includes means, such as a plurality of cooperative connectors 26 for cooperating with support 40 for selectively attaching framework 25 to support 40.

Base 30 includes a ring 31 attached to and supported by framework 25. Ring 31 has a circular inner face 32 and a circular outer face 33.

Turn carriage 100 includes a plurality of components attached to a turn-carriage frame 101. In FIG. 3, frame 101 is only partially shown for clarity. Turn carriage 100 includes means 110, such as a plurality of wheels 111, for rotationally mounting turn carriage 100 on base 30. Wheels 111 including drive wheel 111D, are mounted on frame 101 and rotationally mount turn carriage 100 on inner face 32 of ring 31 of base 30. Turn carriage 100 is rotationally attached to base 30 so as to be rotatable about a yaw axis, such as first axis or turn axis $\theta$ (theta). Turn axis $\theta$ is typically perpendicular to the floor or other support 40 for base unit 20. Thus, turn axis $\theta$ typically is vertical or substantially vertical. Turn carriage 100 can rotate left or right and any number of degrees to align cable 12 in any direction.

Base unit 20 includes power means 190, such as a battery 191 for powering components. Battery 191 is attached to base unit 20, such as to turn-carriage frame 101. Power is distributed from battery 191 to the components by any desirable means, such as power lines, not shown.

Pitch-carriage mounting means, such as a pair of spaced bearings 135 are attached to frame 101 for rotational mounting of pitch carriage 200.

Pitch carriage 200 includes a plurality of components attached to pitch-carriage frame 201. In FIG. 3, frame 201 is only partially shown for clarity. Pitch carriage 200 is rotationally attached to turn carriage 100, such as by shafts 202 attached to frame 201 and journaled in bearings 135, so as to be rotatable about a second or pitch axis $\phi$ (phi) defined by bearings 135. In the exemplary embodiment, pitch carriage 200 may pitch down at an angle of about 35° and rotate upward from there through an angle of about 92° for 127° total motion.

A main datum passage 230 is attached to frame 201 and defines an inner, confined passage relative to frame 201 for midsection 16 of cable 12. In the exemplary embodiment, a main datum passage device attached to pitch carriage frame 201, such as pulley 231 rotationally attached to pitch carriage frame 201, provides main datum passage 230. Main datum passage 230 is where incoming cable 12 first touches main datum pulley 231 when received from an outer confined incoming datum passage 339, as will be subsequently described. Main datum passage 230 provides the first pivot point that is fixed relative to frame 201 for incoming cable 12. Other embodiments of main datum passage 230 could include a ring orifice or the entrance to a tube or similar opening for confined passage of cable 12.

In the preferred embodiment shown, second axis $\phi$ is perpendicular to and intersects turn axis $\theta$. Main datum passage 230 is located at, or near, this intersection. Consequently, the relative polar coordinates $\rho$, $\theta$, $\phi$ of cable end 14 may be rather straightforwardly produced from main datum passage 230. However, other relative axes may be used and the measurements to the point may then be mathematically transformed as is well known in the art, into any desired coordinate system.

A cable supply means 600 is attached to frame 201 and supplies cable 12 from supply end 13 under a predetermined tension to main datum passage 230. In the exemplary embodiment, cable supply means 600 includes a drum or reel 660, upon which cable 12 is wound and a cable tensioning means 605 including a cable tension sensor 610 for sensing the tension in cable 12 supplied to main datum passage 230, and a reel servoed motor 650 coupled to reel 660 such as by belt 655 for rotating reel 660. Reel mounting means, such as a plurality of rollers 670, is mounted to pitch frame 201 for supporting reel 660 such that it may rotate for storage or release of cable 12. In the exemplary embodiment, cable tension sensor 610 includes a sensor and a roller pulley 611 that is spring biased to push against cable 12 between other cable supports. Sensor 610 senses the location of pulley 611 and produces a signal representative thereof. Responsive to the signal from tension sensor 610, reel servoed motor 650 rotates reel 660 to maintain the predetermined tension. Alternatively, computer 700 receives the signal from tension sensor 610 and directs reel servoed motor 650 to maintain a desired tension. In this manner, the desired tension may easily be changed in computer 700 by a user Other cable tension sensing means well-known in the art could be used, such as a load cell to measure load on pulley 611.

Cable positioning means 620 attached to frame 201 includes a plurality of pulleys 622 feeding cable 12 to or receiving cable 12 from a final positioning pulley 623. Final positioning pulley 623 is mounted on a shaft 630 attached to frame 201 so as to slide axially along shaft 630 and feed cable 12 to reel 660 such that cable 12 does not overlap on reel 660.

Cable length measuring means 450 is attached to frame 201 and is coupled to cable 12 for measuring the length $\rho$ (rho) or change of length of cable 12 as free end 14 is moved and placed on a point. Cable length measuring means 450 produces a signal, such as on line 460, indicative of the length $\rho$ (rho) or change of length of cable 12. Cable length measuring means of various configurations are well known in the art. In the illustrative embodiment, cable 12 is partially wrapped around a pulley 455 such that movement of cable 12 rotates pulley 455. A sensor 457, as is well known in the art, such as an optical encoder, translates amount of rotation of pulley 455 to change in cable length and produces a signal indicative thereof.

Pitch carriage 200 includes an angular displacement sensor assembly 300 attached to frame 201 including an incoming confined cable passage 339 for cable 12 between main datum passage 230 and cable free end 14. Cable 12 is in alignment position when the local longitudinal axis 17 of cable 12 at incoming confined cable passage 339 is aligned with main datum passage 230. As cable free end 14 is moved from an old point to a new point that is not directly radially outward from the old point, cable midsection 16 is displaced angularly in angular displacement sensor assembly 300. Angular displacement sensor assembly 300 detects this angular displacement of cable 12 away from alignment position 305 and produces a signal or signals indicative thereof, such as on lines 308 and 309. Angular displacement sensor assembly 300 will be discussed in greater detail later herein.

Turn servoed motor assembly 120 rotates turn carriage 100 about turn axis $\theta$ responsive to the signal from angular displacement sensor assembly 300 indicative of cable displacement about turn axis ($\theta$) so as to move angular displacement sensor assembly 300 toward alignment position 305. As illustrated, turn servoed motor assembly 120 includes a turn servoed motor 122 mounted on turn carriage 100 and a first drive mechanism 125 including a belt 126 connected to first drive wheel 127 connected to drive wheel 111D interacting with inner face 32 of ring 31 of base 30 for rotating turn carriage 100 relative to base 30 and about turn axis $\theta$. As used herein, the term "servoed motor" may apply to any kind of applicable motor actuator such as a servo motor, a stepper motor, or a hydraulic motor for example.

Pitch servoed motor assembly 160 couples pitch carriage 200 to turn carriage 100 for rotating pitch carriage 200 in bearings 135 about pitch axis $\phi$ responsive to the signal from angular displacement sensor assembly 300 indicative of cable 12 movement about pitch axis $\phi$ so as to move angular displacement sensor assembly 300 toward alignment position 305. As shown, pitch servoed motor assembly 160 includes a pitch servoed motor 162 mounted on frame 101 and a pitch drive mechanism 165 including a belt 166 connecting first drive wheel 167 with second drive wheel 168 connected to journal shaft 202 of pitch carriage 200 for rotating pitch carriage 200 in bearings 135.

A turn-carriage measuring means 500 measures the rotational position or change of rotational position of turn carriage 100 relative to base 30 and produces a signal, such as on line 510, indicative thereof. Many such measuring means are well-known in the art. In the exemplary embodiment, an optical encoder 520 includes an optical reader 522 mounted on turn carriage 100 for reading an encoder strip 525 on base 30.

A pitch-carriage measuring means 550 measures the rotational position or change of rotational position of pitch carriage 200 relative to turn carriage 100 and produces a signal indicative thereof. Many such measuring means are well-known in the art. In the exemplary embodiment, pitch-carriage measuring means 550 includes an optical encoder 570 including an optical reader 572 mounted on pitch carriage 200 for reading an encoder strip 575 on arc 140 of turn carriage 100 and for producing a signal indicative of the pitch on signal line 560.

In this manner, turn and pitch carriages 100, 200 rotate so as to follow the movement of free end 14 of cable 12 to a new measured point or between an old measured point and a new point until cable midsection 16 is once again in alignment position 305 in angular displacement sensor assembly 300. At this time, the position of the new point or the change in position of the new point relative to the old point can be determined, such as by computer 700 in response to the signals on lines 460, 510, 560 from measuring means 450, 500, and 550.

The measured point's location may be determined from the signals on 460, 510, and 560, for the purpose of reconstructing the measured surface, by mathematical means well known in the art. In the exemplary embodiment, computer 700 interprets the signals on lines 460, 510, and 560 as representing the $\rho$, $\theta$, and $\phi$ components of a point P (not shown) in a polar coordinate system. Because the force of gravity tends to displace the cable midsection 16 downward along a catenary curve, the measured location of cable free end 14 is not coincident with point P, but contains an offset dependent on the cable's extended length, the cable's orientation relative to the force of gravity, the cable's density per unit length, and the cable's tension. Computer 700 determines the offset from these known parameters using mathematical means well-known in the art to determine the measured location of cable free end 14 relative to point P. For increased accuracy, an accelerometer or other level sensor (not shown) may be mounted in base unit 20, such as to pitch carriage 200, for the purpose of determining the cable's precise orientation relative to the force of gravity.

The location signals on distance signal line 460, rotation signal line 510, and pitch signal line 560 are stored in connection with the measured point. This can be done in any desirable manner, such as in a local computer in base unit 20, not shown, or, as in the illustrative example, transmitted, such as by BLUETOOTH®, to PDA 701.

Signal communication within base unit 30 may be performed in any desirable manner. The exemplary configuration uses wires. Wires are easily used for connectivity because the only relative movement between sending elements and receiving elements is the change in pitch angle φ.

FIGS. 4A, 4B, 5, 6, 7, and 8 are views of an illustrative embodiment of an angular displacement sensor assembly 300, such as gimbaled angular displacement sensor assembly 300G, including a biased main gimbal 310 in the form of a plate gimbal. Nine other embodiments of angular displacement sensor assembly 300 are shown in later figures and described therewith. Angular displacement sensor assembly 300 is attached to second frame 201 and includes a confined incoming datum passage between main datum passage 230 and cable free end 14 wherein cable 12 is in alignment position 305 when the local longitudinal axis 17 of cable 12 is aligned with datum passage 230. Angular displacement sensor assembly 300 senses the angular displacement of cable 12 away from alignment position 305 and produces a displacement signal, such as on lines 308, 309 indicative thereof. The displacement signal instructs turn servo motor 122 and/or pitch servo motor 162 to move turn carriage 100 and/or pitch carriage 200 such that cable 12 is returned to cable alignment position 305.

Figure 4A:
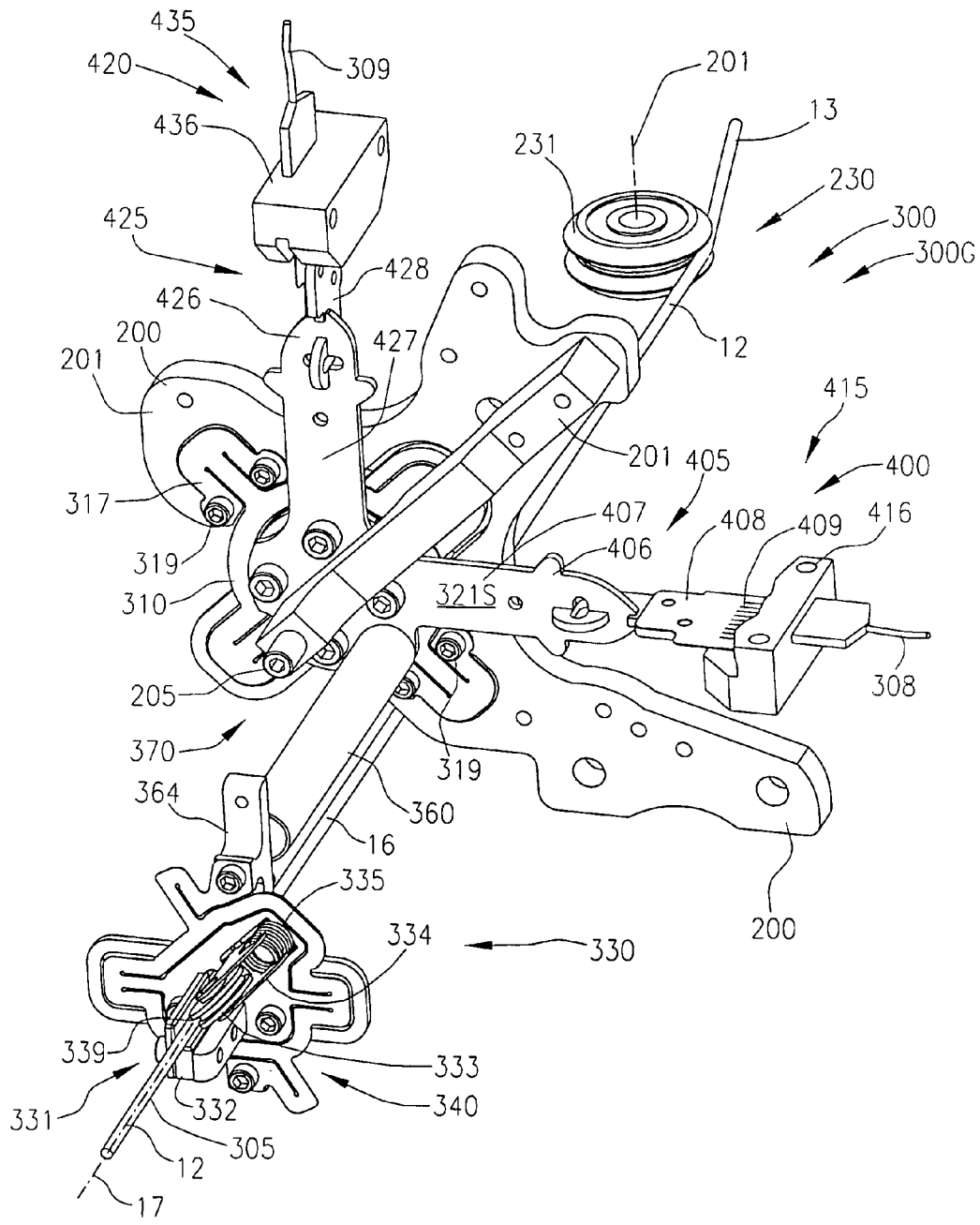
FIG. 4A is a front, top, right side perspective view of the cable angular displacement sensor including a biased main gimbal in the form of a plate gimbal.
Figure 4B:
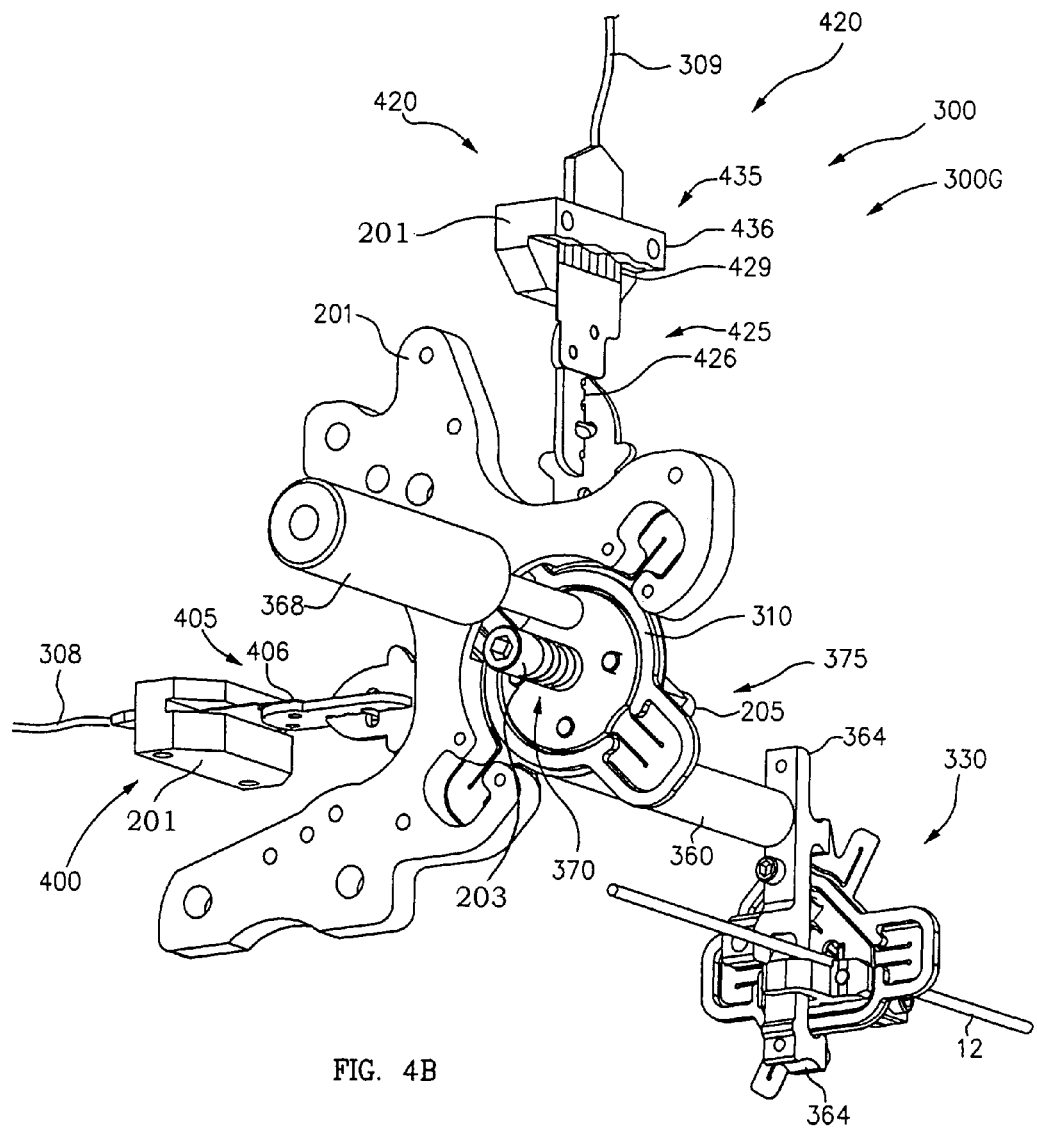
FIG. 4B is a back, bottom, left side perspective view of the cable angular displacement sensor of FIG. 4A.
Figure 5:
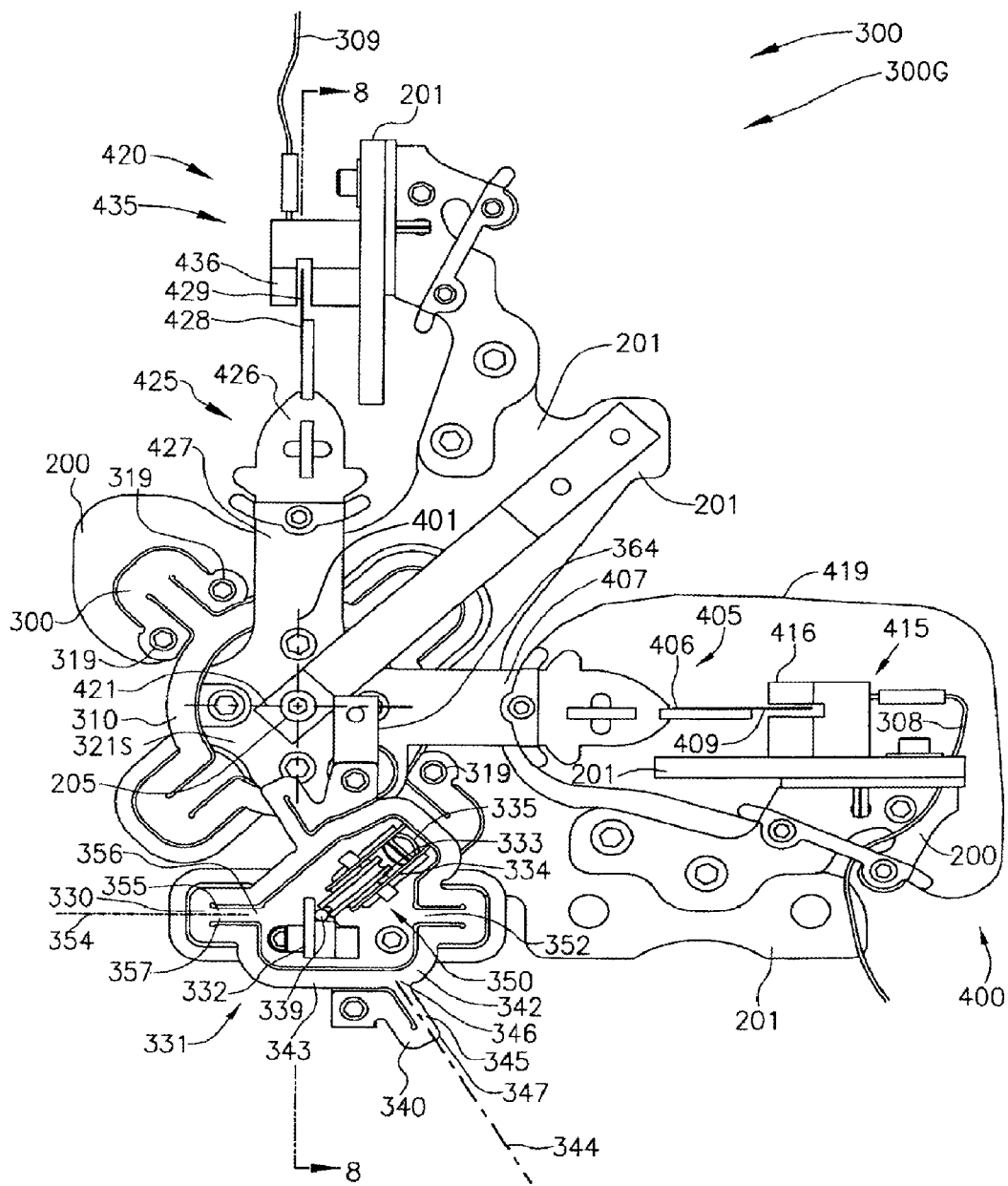
FIG. 5 is a front elevation view of the main angular displacement gimbal of FIG. 4A and FIG. 4B.
Figure 6:
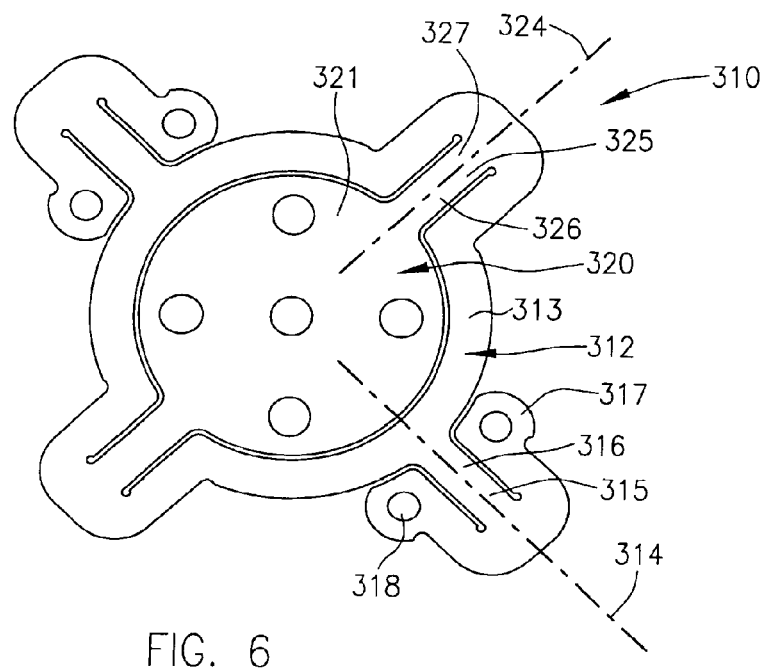
FIG. 6 is an enlarged front elevation view of the plate gimbal of FIG. 5.
Figure 7:
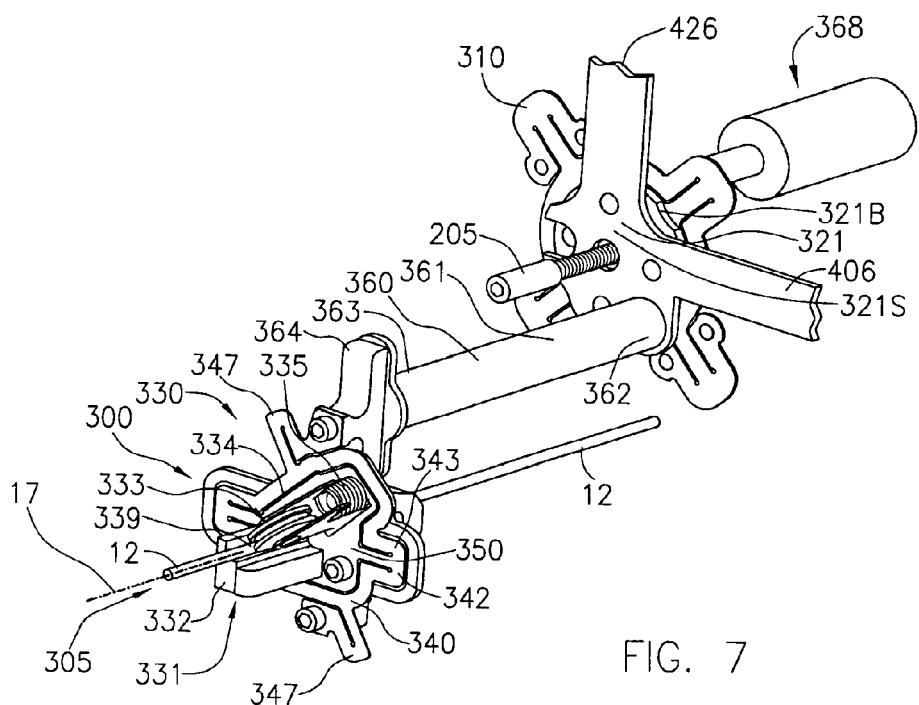
FIG. 7 is an enlarged front, top, right side, perspective of the cable passage assembly of FIGS. 4 and 5.
Figure 8:
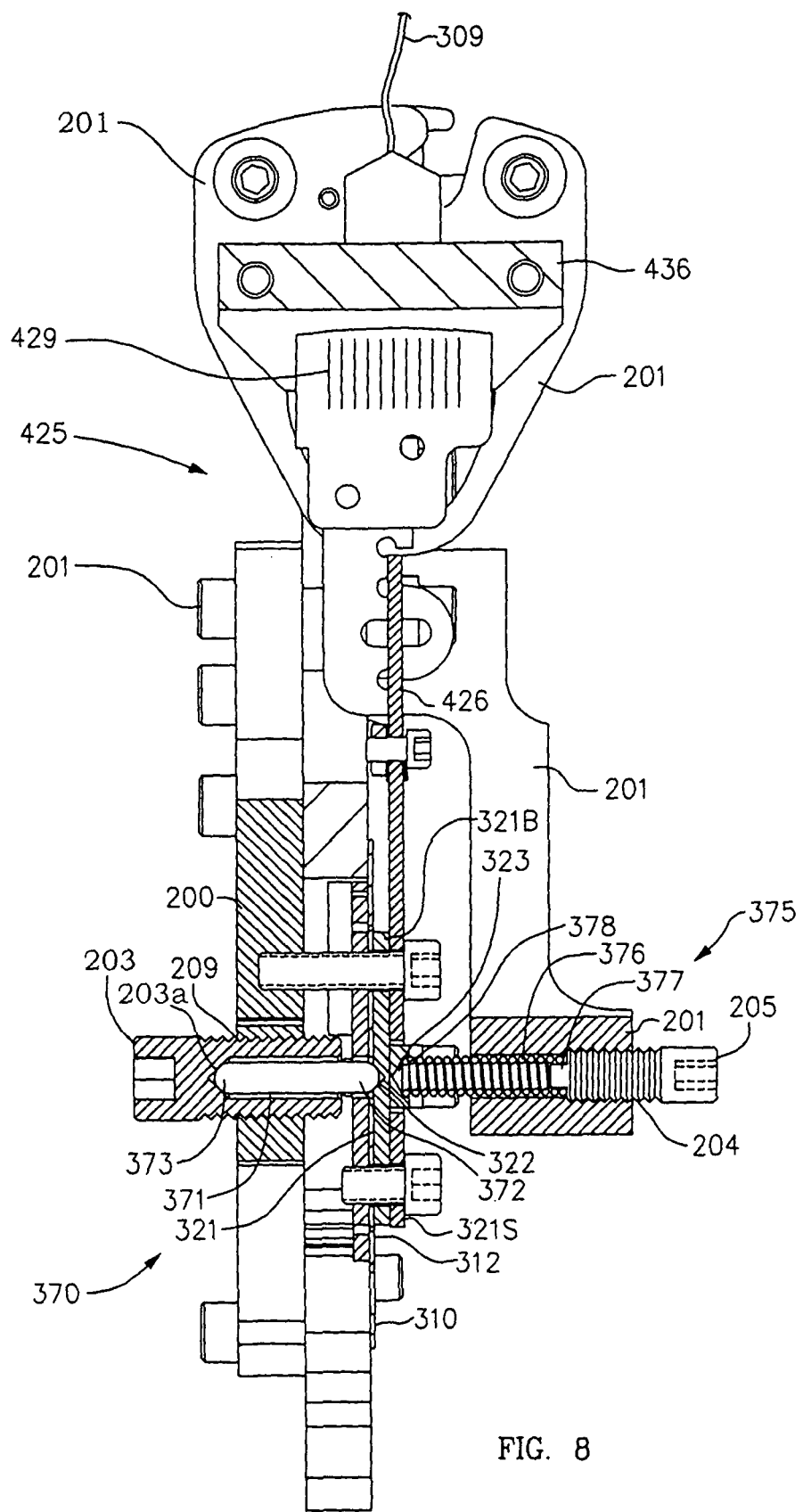
FIG. 8 is an enlarged cross sectional view of the main gimbal thrust bearing assembly.

FIG. 4A is a front, top, right side perspective view of the cable angular displacement sensor assembly 300G including a biased main gimbal 310 in the form of a plate gimbal attached to a portion of pitch-carriage frame 201. FIG. 4B is a back, bottom, left side perspective view of the cable angular displacement sensor assembly 300G of FIG. 4A. FIG. 5 is a front elevation view of the angular displacement sensor assembly 300G of FIG. 4A. FIG. 6 is an enlarged front elevation view of main gimbal 310 of FIGS. 4A and 4B. FIG. 7 is an enlarged front, top, right-side perspective view of the cable passage assembly 330 of FIGS. 4A, 4B and 5. FIG. 8 is an enlarged cross sectional view of main gimbal thrust bearing assembly 370 and biasing assembly 375 of FIG. 5.

Turning for a moment to FIG. 6, there is shown an enlarged front elevation view of main gimbal 310 of FIGS. 4A, 4B and 5. Main gimbal 310 is a planar, two axis biased gimbal comprising an outer gimbal 312 and an inner gimbal 320. Outer gimbal 312 includes an outer gimbal ring 313 supported by the inner ends 316 of a pair of outer torsion members 315 on a first gimbal axis 314. Note that "ring" is used due to gimbal tradition, but this element may be any functional shape. Bores 318 receive fasteners 319, such as bolts, as seen in FIGS. 4A and 5, that fasten outer ends 317 of outer torsion members 315 to pitch carriage 200. Inner gimbal 320 includes an inner gimbal ring 321 supported by the inner ends 326 of a pair of inner torsion members 325 on a second gimbal axis 324. Inner torsion members 325 are supported at their outer ends 327 by outer gimbal ring 313. Outer gimbal ring 313 is free to rotate about first gimbal axis 314. Inner gimbal ring 321 is free to rotate about second gimbal axis 324 relative to outer gimbal ring 313 and, thus, may rotate in any direction. Main gimbal 310 is a biased gimbal, in that gimbal rings 313, 321 are biased to rotate to a neutral position when rotational forces are removed. In main gimbal 310, the neutral bias is provided by paired torsion members 315, 325.

Returning to FIGS. 4A, 4B, 5, 7 and 8, the other main components of angular displacement sensor assembly 300G are a cable passage assembly 330, a gimbal thrust bearing assembly 370, as biasing assembly 375, a first angular displacement sensor 400, and a second angular displacement sensor 420.

FIG. 7 is an enlarged front, top, right side, perspective of the cable passage assembly 330 of FIGS. 4A, 4B, and 5. Cable passage assembly 330 is mounted on sensor arm plate 321S of inner ring 321 (not seen) of main gimbal 310 and rotates inner ring 321 responsive to angular displacement of cable 12 from cable alignment position 305. An arm 360, such as thin tube 361, has an inner end 362 connected to inner gimbal ring 321 and an outer end 363 including a bracket 364, best seen in FIG. 4B.

An anti-moment gimbal 340, such as a plate gimbal, is mounted on bracket 364. Anti-moment gimbal 340 is a planar, two axis biased gimbal similar to main gimbal 310 and comprises an outer gimbal 342 and an inner gimbal 350. As best seen in FIG. 5, outer gimbal 342 includes an outer gimbal ring 343 supported by the inner ends 346 of a pair of outer torsion members 345 on a first gimbal axis 344. Outer torsion members 345 are supported at their outer ends 347 by bracket 364. Inner gimbal 350 includes an inner gimbal ring 352 supported by the inner ends 356 of a pair of inner torsion members 355 on a second gimbal axis 354. Note that "ring" is used due to gimbal tradition, but this element may be any functional shape. Inner torsion members 355 are supported at their outer ends 357 by outer gimbal ring 343. Outer gimbal ring 343 may rotate about first gimbal axis 344. Inner gimbal ring 352 may rotate about second gimbal axis 354 relative to outer gimbal ring 343 and, thus, may rotate in any direction.

Incoming cable passage members 331, including dihedral blocks 332 and a biased pulley 333, define a confined incoming datum passage, such as confined passage 339, for confined passage of midsection 16 of cable 12. Passage members 331 are mounted on inner ring 352 of anti-moment gimbal 340. Pulley 333 is mounted on a swinging yoke 334 and biased toward the cable confining position by a spring 335. This biasing allows pulley 333 to move slightly to allow for passage of protuberances on cable 12. Of course, there are many other manners of accomplishing this confined cable passage 339. For example, instead of dihedral blocks 332, a second pulley could be used, or a plurality of rollers could be used.

Anti-moment gimbal 340 decouples sensor assembly 300G from applying any moment to cable 12 in confined cable passage 339. Anti-moment gimbal 340 may not be necessary for all types of cable 12.

As seen in FIG. 7, a counter mass 368 may be attached to the back side of inner gimbal ring 321 to counter the mass of arm 360 and cable passage assembly 330 so as to balance main gimbal 310 to a more planar neutral position.

As best seen in FIGS. 3 and 4A, cable 12 is in the alignment position 305 when local longitudinal axis 17 of cable 12 in confined passage 339 is aligned with main datum passage 230 and main gimbal 310 and anti-moment gimbal 340 are in the neutral position. With cable 12 in alignment position 305, the measurement of a point may be taken. Cable free end 14 is then moved to a new point for measurement. If cable midsection 16 is displaced angularly during movement to the new point, midsection 16 exerts a side force against outer cable passage members 331 which, through arm 360, exert a moment on inner gimbal ring 321 of main gimbal 310 so as to rotate it.

FIG. 8 is an enlarged cross sectional view of gimbal thrust bearing assembly 370. Thrust bearing assembly 370 provides a front-to-back pivot point for inner gimbal ring 321 and also may bias or pre-load inner gimbal ring 321 to a position out of the planar position. A pivot rod 371 includes a front end 372 and a back end 373. Inner gimbal ring 321 includes a bearing plate 321B attached to the front of inner gimbal ring 321. Bearing plate 321B includes a rear facing pivot seat 322 and a front facing pivot seat 323. The front end 372 of pivot rod 371 and rear facing pivot seat 322 are adapted such that bearing plate 321B, and hence inner gimbal ring 321, pivots on front end 372. Preferably, also, pivot rod back end 373 and pitch frame 201 are adapted such that pivot rod back end 373 pivots on pitch carriage 200. These functions can be implemented in many manners. In the exemplary embodiment, pivot rod front end 372 is curved, such as being hemispherical. Mounted on or integral with inner gimbal ring 321 and moving therewith are a bearing plate 321B and sensor arm plate 321S. Bearing plate 321B includes a concave conical pivot seat 322 for receiving front end 372 in a pivoting relationship. Pitch frame 201 includes a set screw 203 adjustably threadably engaged in threaded bore 209. Set screw 203 includes a front-facing, concave, conical pivot seat 203a for receiving pivot rod back end 373. Pivot rod back end 373 is curved, such as being hemispherical, for pivoting in seat 203a. Note that pivot rod 371 pivots on both ends 372, 373 such that it only can apply an axial force and, other than its own weight, pivot rod 371 cannot apply a side load or moment to main gimbal 310. Pivot rod 371 cannot carry any of the weight of main gimbal 310 or its attachments including anti-moment gimbal 340.

Because main gimbal 310 may exhibit tensional discontinuities at the planar position, set screw 203 is adjusted so that inner gimbal ring 321 is out of planar with the remainder of main gimbal 310.

Means, such as a biasing assembly 375, may be used to further assure that inner gimbal ring 321 is positioned at a particular front-to-rear position against pivot rod 371. To this end, a compression member, such as spring 376, bears against pitch frame 201 and inner gimbal ring 321 to bias inner gimbal ring 321 against pivot rod 371. Spring 376 includes a front end 377 and a back end 378. Pitch frame 201 includes means, such as a set screw 205 adjustably threadably engaged in threaded bore 204, for bearing on spring front end 377 for adjusting the compression biasing of spring 376. Spring back end 378 bears on inner gimbal ring 321, such on bearing plate 321B, such as on front seat 323 thereon. Spring 376 and inner gimbal ring 321 may be adapted (not shown), such as with a hemispherical cap on spring 376 and a concave conical seat on inner gimbal ring 321 for receiving the cap, such that spring 376 pivotly bears against inner gimbal ring 321 so as to impart no moment to inner gimbal ring 321.

Although, the terms "front" and "back" are used to conform to the illustration, thrust bearing assembly 370 can be easily modified to operate in the reverse manner with pivot rod 371 in front of inner gimbal ring 321.

Returning to FIGS. 4A, 4B, and 5 showing gimbaled angular displacement sensor assembly 300G, as best seen in FIG. 5, the movement about a first sensor axis 401 of inner gimbal ring 321 caused by angular displacement of cable 12 is sensed by first angular displacement sensor 400. The movement of inner gimbal ring 321 about a second sensor axis 421 caused by angular displacement of cable 12 is sensed by second angular displacement sensor 420. In the exemplary embodiment, first and second angular displacement sensors 400, 420 are optical encoders as are well known in the art.

First sensor 400 includes a moving portion 405, which rotates with inner gimbal ring 321, and a fixed portion 415 attached to pitch carriage 200. Moving portion 405 includes a radial arm 406 having an inner end 407 connected to sensor arm plate 321S of inner gimbal ring 321 and an outer end 408 having an encoder strip 409 thereon. Arm 406 rotates with inner gimbal ring 321 about first sensor axis 401. Fixed portion 415 includes an encoder read head 416 attached to pitch carriage 200 for reading encoder strip 409. Read head 416 outputs a signal, such as on line 308, indicative of rotation of inner gimbal ring 321 about first sensor axis 401.

Second sensor 420 includes a moving portion 425, which rotates with inner gimbal ring 321, and a fixed portion 435 attached to pitch carriage 200. Moving portion 425 includes a radial arm 426 having an inner end 427 connected to sensor arm plate 321S of inner gimbal ring 321 and an outer end 428 having an encoder strip 429 thereon. Arm 426 rotates with inner gimbal ring 321 about second sensor axis 421. Fixed portion 435 includes an encoder read head 436 attached to pitch carriage 200 for reading encoder strip 429. Read head 436 outputs a signal, such as on line 309, indicative of rotation of inner gimbal ring 321 about the second sensor axis 421.

In the exemplary embodiment, the first sensor axis 401 corresponds to turn axis $\theta$ and second sensor axis 421 corresponds to second axis $\phi$ such that the signal from first sensor 400 may directly be used to control turn servoed motor 122 to rotate turn carriage 100 toward cable alignment position 305 and the signal from second sensor 420 may directly be used to control pitch servoed motor 162 to rotate pitch carriage 200 toward the cable alignment position 305.

If the first sensor axis 401 and second sensor axis 421 do not correspond to turn axis $\theta$ and second axis $\phi$, then the output signals from sensors 400, 420 are transposed by means well known in the art into corresponding turn axis $\theta$ and second axis $\phi$ rotations before being used to command servoed motors 122, 162 for rotation of turn and pitch carriages 100, 200 toward cable alignment position 305 wherein a measurement of a point may be taken.

As seen in FIG. 5, flexible anti-dust bag, such at flexible anti-dust bag 419, shown in cross-section, covering first displacement sensor 400, may be used to surround sensors to protect them from dust and dirt.

FIG. 9 is a perspective schematic of a second embodiment of the cable angular displacement sensor assembly 300 including proximity or contact sensors, such as contact sensors 380 mounted to frame 201. Incoming midsection 16 of cable 12 is shown in alignment position 305 wherein the local longitudinal axis 17 of cable 12 in confined incoming datum passage 339 is aligned with main datum passage 230.

A first pair 380A of contact sensors 381A, 381B, attached to frame 201, are equally spaced on opposite sides of cable 12 for detecting angular displacement of cable 12 about a first contact sensor axis perpendicular to a midline between first sensors 380A. A second pair 380B of contact sensors 381C, 381D, attached to frame 201, are equally spaced on opposite sides of cable 12 for detecting angular displacement of cable 12 about a second contact sensor axis perpendicular to a midline between second sensors 380B. If cable 12 is angularly displaced so as to touch sensor 381A, sensor 381A produces a signal on line 308C1 indicating rotation is required about the first contact sensor axis in a first direction. If cable 12 touches sensor 381B, sensor 381B produces a signal on line 308C2 indicating rotation is required about the first contact sensor axis in the opposite direction. If cable 12 is angularly displaced so as to touch sensor 381C, sensor 381C produces a signal on line 309C1 indicating rotation is required about the second contact sensor axis in a first direction. If cable 12 touches sensor 381D, sensor 381D produces a signal on line 309C2 indicating rotation is required about the second contact sensor axis in the opposite direction. Depending on the relationship between the first and second contact sensor axes with $\theta$ and $\phi$, the signals on lines 308C1, 308C2, 309C1 and 309C2 may directly control turn servoed motor 122 or pitch servoed motor 162 or may be transposed by means well known in the art into corresponding turn axis $\theta$ and second axis $\phi$ rotations before being used to command servoed motors 122, 162 for rotation of turn carriage 100 and pitch carriage 200 toward cable alignment position 305 wherein a measurement of a point may be taken.

Because the slight gaps between cable 12 and sensors 381A-381D introduce a slight error, contact sensors 380 are dithered about the sensor axes so that cable 12 is centered in the alignment position 305 before taking a measurement. Servoed motors 122, 162 are controlled to dither contact sensors 380.

FIG. 10 is a perspective schematic of a third embodiment of the cable angular displacement sensor assembly 300, including optical sensors 385 mounted to frame 201 for detecting movement of cable 12 from alignment position 305. Cable 12 is shown in alignment position 305 wherein the local longitudinal axis 17 of cable 12 in confined incoming datum passage 339 is aligned with main datum passage 230.

In the exemplary embodiment, each optical sensor 385 includes a light source 386, some focusing lenses 387A and 387B, and a light sensor 388.

A pitch optical sensor 385A includes light source 386A that emits light and is disposed on one side of cable 12 and a light sensor 388A for receiving the emitted light is disposed on the other side of cable 12. Light sensor 388A may include a CCD array 389A or other light detector as is well known. One or more lenses, such as lenses 387A and 387B, may be used to focus or magnify the light for accurate reading. Sensor 388A detects when the shadow of cable 12 moves up or down and produces a signal, such as on line 309D, indicative thereof for directing pitch servoed motor 162 to more pitch carriage 200 so as to return cable 12 to alignment position 305.

A turn optical sensor 385B includes light source 386B that emits light and is disposed on one side of cable 12 and light sensor 388B for receiving the light is disposed on the other side of cable 12. Light sensor 388B may include a CCD array 389B or other light detector as is well known. One or more lenses, such as lenses 387A, mounted to frame 201, may be used to focus or magnify the light for accurate reading. Sensor 388B detects when the shadow of cable 12 moves left or right and produces a signal, such as on line 308D, indicative thereof for directing turn servoed motor 122 to move turn carriage 100 so as to return cable 12 to alignment position 305.

In the exemplary embodiment, the output of optical sensors 385 corresponds directly to movement in θ and φ. However, other axes may be used and translated into movement in θ and φ.

Other types of optical sensors could be used, such as reflecting light off cable 12 to a light detector.

FIG. 11 is a perspective schematic of a fourth embodiment of the cable angular displacement sensor assembly 300 including a magnetic or electromagnetic sensor 390. A pitch electromagnetic sensor 390A detects the proximity of cable 12 and, when cable 12 moves up or down, produces a signal, such as on line 309E, indicative thereof for directing pitch servoed motor 162 to move pitch carriage 200 so as to return cable 12 to alignment position 305. A turn optical sensor 390B detects the proximity of cable 12 and, when 12 moves left or right, and produces a signal, such as on line 308E, indicative thereof for directing turn servoed motor 122 to move turn carriage 100 so as to return cable 12 to alignment position 305 wherein the local longitudinal axis 17 of cable 12 in confined incoming datum passage 339 is aligned with main datum passage 230.

Magnetic sensors could also be used to detect the proximity of cable. In the exemplary embodiment, the output of sensors 390 corresponds directly to movement in θ and φ. However, other axes may be used and translated into movement in θ and φ.

Figure 12:
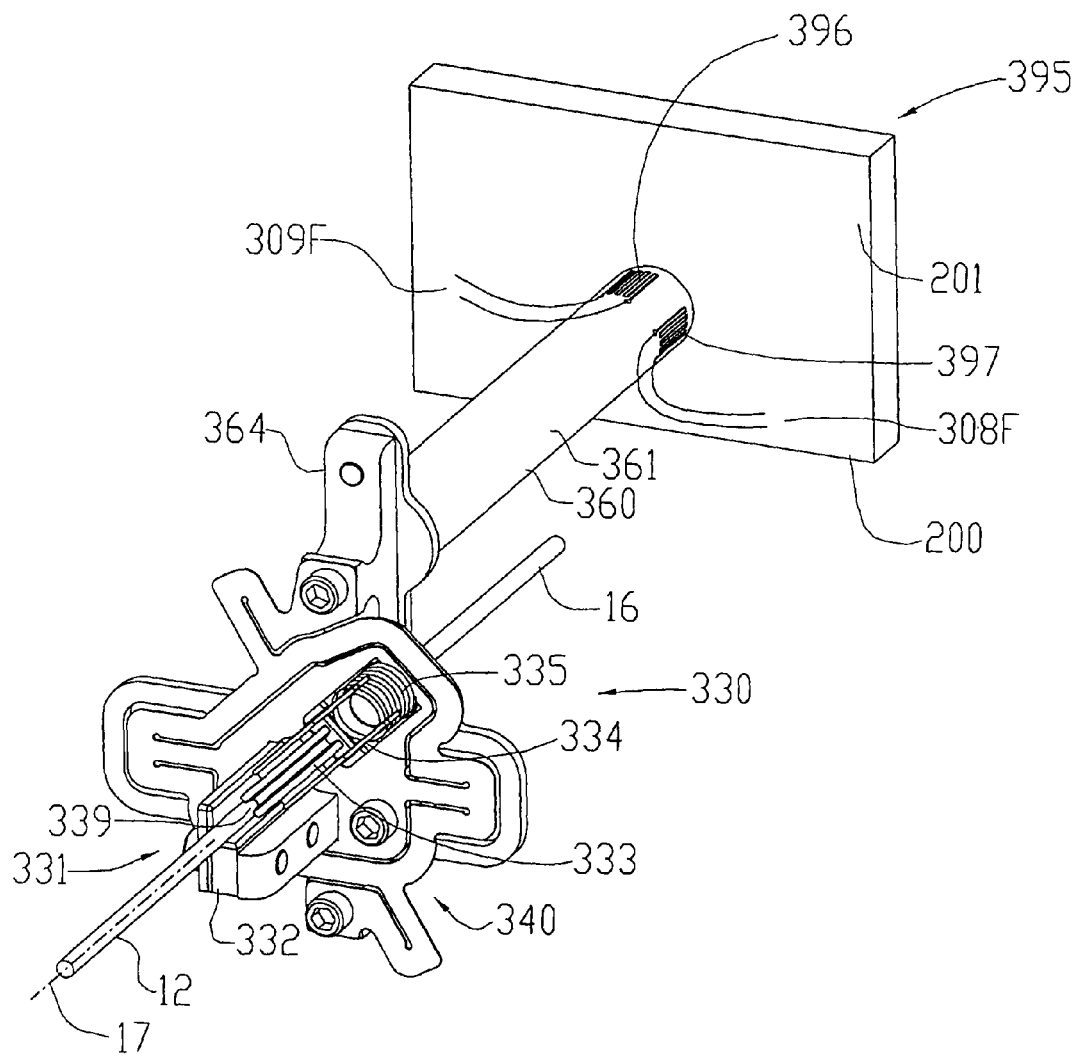
FIG. 12 is a perspective view of a fifth embodiment of the cable angular displacement sensor in the form of a moment sensor.

FIG. 12 is a perspective view of a fifth embodiment of the cable angular displacement sensor assembly 300 including a moment sensor 395. Tube 360 from the anti-moment gimbal from the confined cable passage 339 is solidly attached to frame 201. As discussed elsewhere, other means of producing a confined cable passage 339 such as in FIG. 12 are possible. For example confined passage 339 could be a tube with a close-fitting hole about the outer diameter of cable 12 that the cable 12 passes through, or could be opposing rollers that the cable passes between.

When cable 12 is moved up or down, or to the right or to the left though confined cable passage assembly 330, a side force is transmitted through confined cable passage 339, as a moment on arm 360, such as thin tube 361. Arm 360 produces detectable strain on load cells, such as strain gages 396 and 397 mounted on arm 360. Strain gages 396 and 397 produce strain signals which are processed in a manner well known in the art. Other types of load cells known in the art, such as other strain gage arrangements, piezo-resistive-element load cells, hydraulic load cells, pneumatic load cells and optical load cells, may be used. The strain induced on 360 in the vertical axis is detected by strain gage 396 and produces a signal, such as on line 309F, indicative thereof for directing turn servo motor 162 to move pitch carriage 200 so as to return cable 12 to alignment position 305. The strain induced on 360 in the horizontal axis is detected by strain gage 397 and produces a signal, such as on lines 308F, indicative thereof for directing turn servo motor 122 to move carriage 200 so as to return cable 12 to alignment position 305 wherein the local longitudinal axis 17 of cable 12 in confined incoming datum passage 339 is aligned with main datum passage 230.

Other arrangements of moment-load cell well known in the art may be applied to the mount end of thin tube 360 at the interface with 201.

Figure 16:
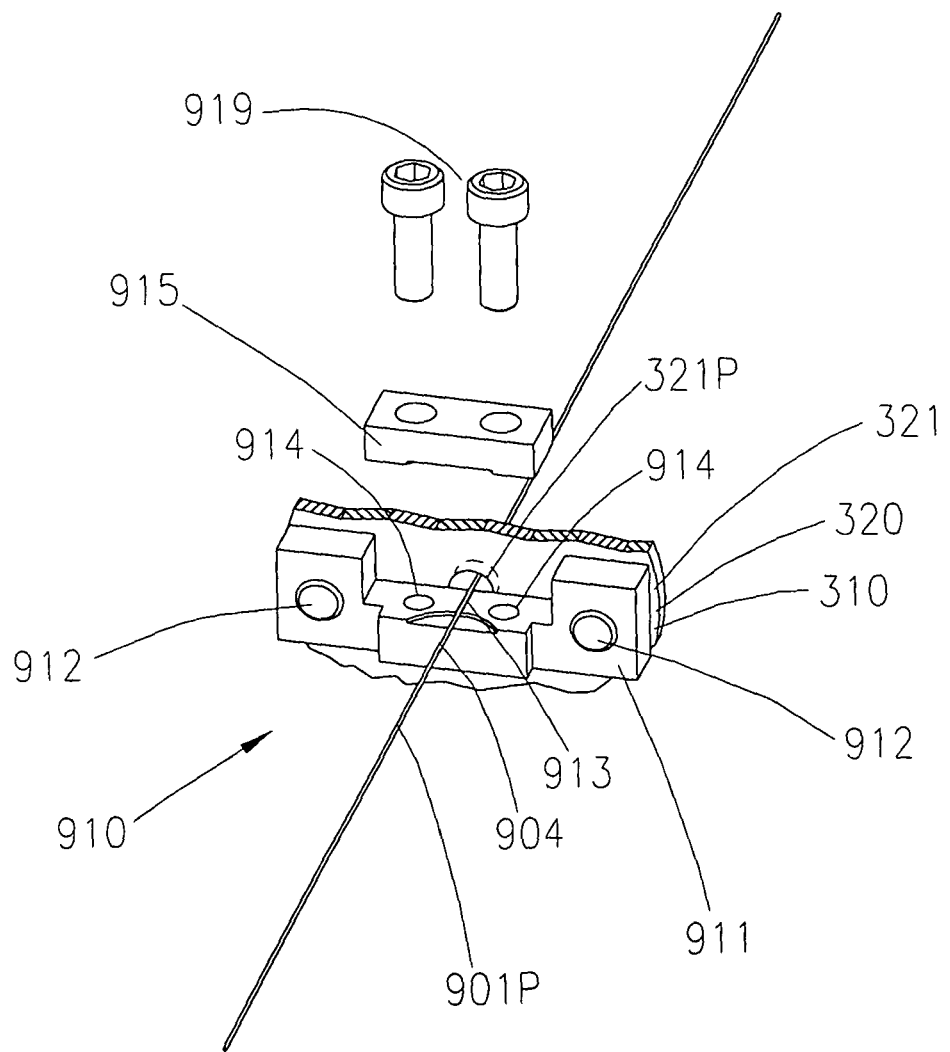
FIG. 16 is an enlarged, exploded, partially-cut-away perspective view of the wire clamp and gimbal of FIG. 15.

FIG. 14 is a front, top, right side perspective view, similar to FIG. 4B, of a second embodiment of a main gimbal thrust support assembly 900 including a thin flexible tension member, such as a line or wire 901, such as piano wire 901P. FIG. 15 is a cross sectional view, similar to FIG. 8, of thrust support assembly 900 for main gimbal 310. FIG. 16 is an enlarged, exploded, partially-cut-away perspective view of the attachment clamp 910 of piano wire 901P to gimbal 310 of FIGS. 14 and 15. Thrust support 900 replaces thrust bearing assembly 370 of FIG. 8.

Piano wire 901P includes a front end 902, a back end 903 and a midsection 904. Piano wire 901P has a diameter of about 0.009".

As best seen in FIG. 16, attachment means, such as clamp 910, attaches midsection 904 of piano wire 901P to main gimbal 310, such as to inner gimbal ring 321 of inner gimbal 320. Inner gimbal ring 321 includes a central bore or passage 321P therethrough. Preferably, passage 321P is central to gimbal 310. Clamp base 911 is attached, such as by bolts 912, to inner gimbal ring 321 so as to support wire 901P at the center of passage 321P. Base 911 may include a groove 913 for retaining wire 901P. Clamp moving member 915 attaches to base 911, such as with bolts 919 in threaded bores 914, so as to clamp wire 901P.

Returning to FIGS. 14 and 15, pitch carriage frame 201 includes a front support 201f and a back support 201b for supporting front end 902 and back end 903 respectively of plano wire 901P. Supports 201f, 201b are spaced sufficiently, such as about four inches for a 0.009" diameter plano wire 901P, to minimize the moment wire 901P can exert on gimbal 310.

In the exemplary embodiment, piano wire 901P is attached as follows. Wire 901P is threaded through bore 321P in main gimbal 310. Wire front end 902 is passed through a slot or bore in front support 201f, through compression spring 922 and is crimped in ferrule 921. Wire back end 903 is passed through a slot or bore in back support 201b. Wire 901P is tensioned, such as by pulling on back end 903 to partially compress spring 922 and is retained in tension, such as by application of back clamp 925. Clamp 910 is then attached to wire 901P as described above so as to retain main gimbal 310 in the neutral position front to back and to resist front to back movement of main gimbal 310 from any applied thrust forces and return gimbal 310 to the neutral position.

Figure 17:
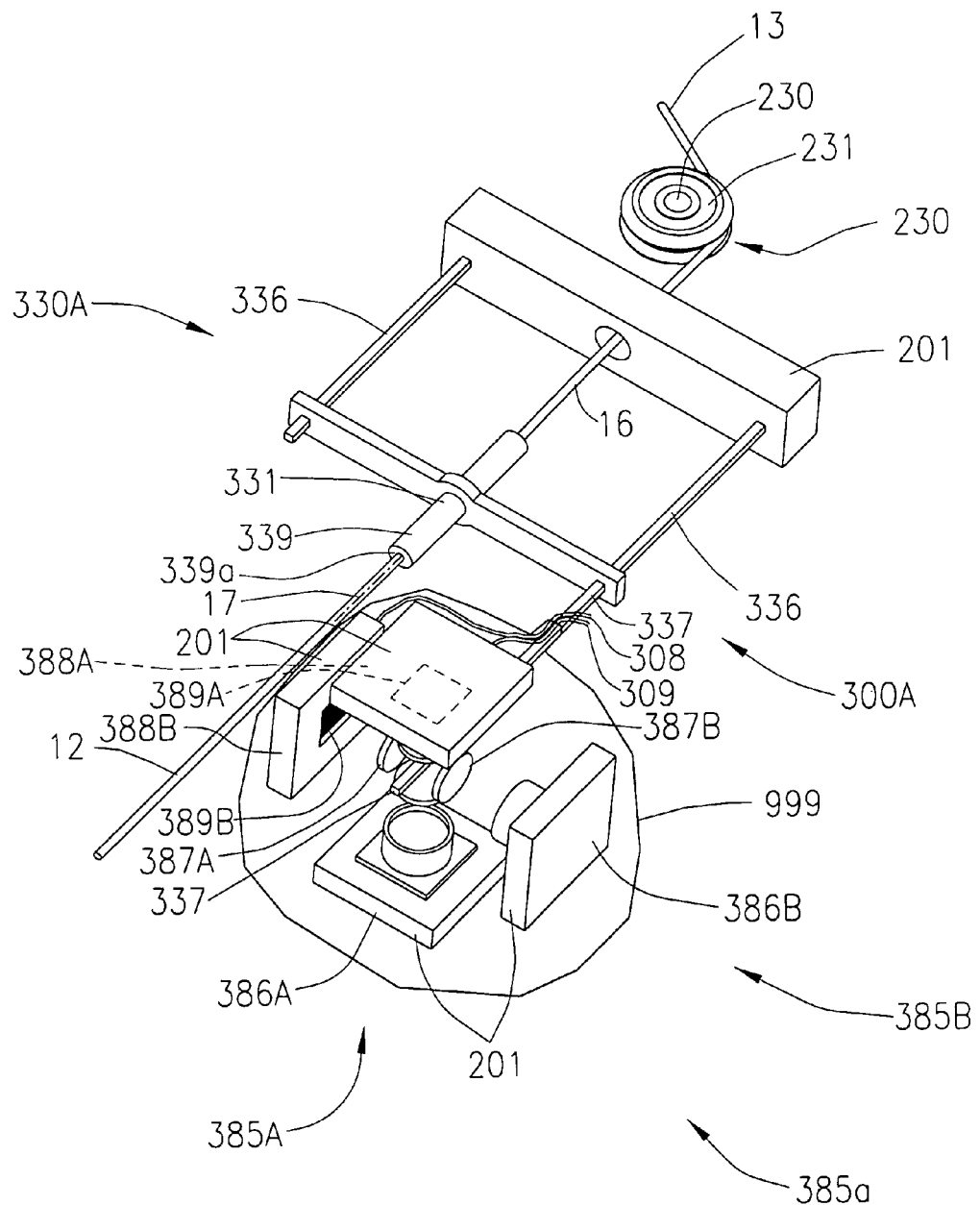
FIG. 17 is a perspective view of a sixth embodiment of the cable angular displacement sensor including an off-cable optical sensor.

FIG. 17 is a perspective view of a sixth embodiment of cable angular displacement sensor assembly 300A including off-cable optical sensors 385a, similar to optical sensors 385 of FIG. 10.

Midsection 16 of incoming cable 12 is shown in the alignment position 305 wherein the local longitudinal axis 17 of cable 12 in confined incoming datum passage 339 is aligned with main datum passage 230. Cable passage assembly 330A, includes incoming cable passage member 331 mounted to frame 201 on a resilient flexible support member or members, such as on flexible rods 336. Flexible rods 336 have a fixed end attached to frame 201 and a free end attached to cable passage member 331. Free end moves sideways in any direction responsive to a side force. Flexible rods 336 are in a neutral position when there is no side force from cable 12 on cable passage member 331. After a side force by cable 12 moves cable passage member 331 and flexible rods 336 to the side, flexible rods 336 return to the neutral position when the side force from cable is removed. Cable passage member 331 includes confined incoming datum passage 339, such as bore 339a, though which cable 12 passes. The free ends of flexible rods 336 are parallel to local longitudinal axis 17 of cable 12. Cable passage assembly 330A may include a projection, such as outward projection 337, which parallels local longitudinal axis 17 of cable 12. Confined cable passage 339 aligns with local longitudinal axis 17 of cable 12 with movement of cable 12 out of alignment position 305 and moves cable passage member 331 in the direction of cable movement by the bending of flexible rods 336. Optical sensors 385a function in the same manner as sensors 385 of FIG. 10 except, instead of detecting movement of cable 12 relative to frame 201, they detect movement of cable passage assembly 330A, such as movement of projection 337, relative to frame 201.

In the exemplary embodiment, each optical sensor 385 includes a light source, some focusing lenses, and a light sensor.

A turn optical sensor 385A, mounted to frame 201, includes light source 386A that emits light and is disposed on one side of cable 12 and a light sensor 388A for receiving the emitted light is disposed on the other side of cable 12. Light sensor 388A may include a CCD array 389A or other light detector as is well known. One or more lenses, such as lenses 387A and 387B, may be used to focus or magnify the light for accurate reading. Sensor 388A detects when the shadow of projection 337 moves left or right and produces a signal, such as on line 308, indicative thereof for directing turn servoed motor 122 to move turn carriage 100 so as to return cable 12 to alignment position 305.

A pitch optical sensor 385B, mounted to frame 201, includes light source 386B that emits light and is disposed on one side of cable 12 and light sensor 388B for receiving the light is disposed on the other side of cable 12. Light sensor 388B may include a CCD array 389B or other light detector as is well known. One or more lenses, such as lenses 387A, 387B, mounted to frame 201, may be used to focus or magnify the light for pitch and turn for accurate reading. Sensor 388B detects when the shadow of projection 337 moves up or down and produces a signal, such as on line 309, indicative thereof for directing pitch servoed motor 162 to move pitch carriage 200 so as to return cable 12 to alignment position 305.

In the exemplary embodiment, the output of optical sensors 385a corresponds directly to movement in θ and ϕ. However, other axes may be used and translated into movement in θ and ϕ by methods that are well known.

Off-cable optical sensors 385a have several advantages over on-cable sensors 385 of FIG. 10. First, the length of projection 337 to sensors 385a amplifies the displacement of cable 12 at confined passage 339 such that readings are more easily taken. Second, optical sensors 385a, unlike optical sensors 385, are not directly exposed to cable 12, which may carry dirt and other contaminants that could prevent readings. Also, off-cable optical sensors 385a can be more easily enclosed and protected from dust and dirt in a flexible bag, such as flexible anti-dust bag 999, shown in diagrammatic representation.

Figure 18:
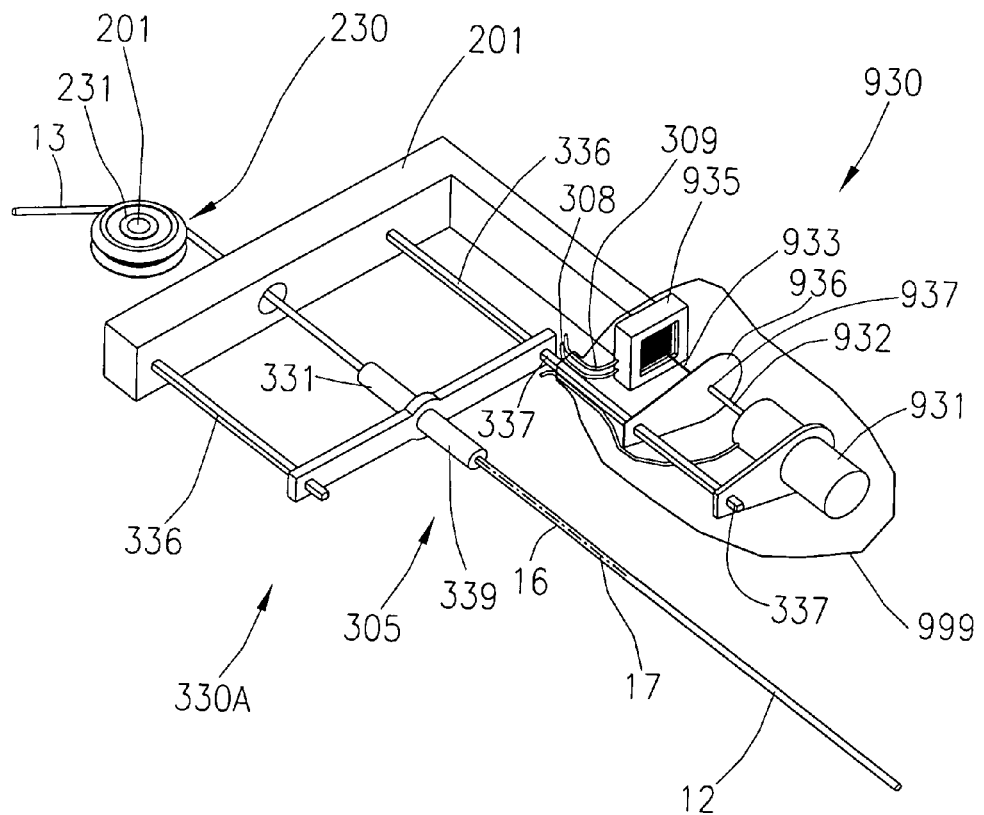
FIG. 18 is a perspective view of a seventh embodiment of the cable angular displacement sensor including an off-cable laser sensor.

FIG. 18 is a perspective view of a seventh embodiment of the cable angular displacement sensor assembly 300A including an off-cable, laser sensor 930

Cable passage assembly 330A functions as described with respect to FIG. 17, above.

A laser 931, or other light source, is mounted to a portion of cable passage assembly 330A, such as to projection 337, such that laser beam 932 emitted by laser 931 parallels local longitudinal axis 17 of cable 12 at confined passage 339. A laser beam sensor, such as a CCD array 935, is mounted on frame 201. Array 935 receives laser beam 932, detects motion of laser beam 932 away from the cable alignment position 305 and produces a signal or signals, such as on signal lines 308 and 309, indicative thereof for directing turn servoed motor 122 to move turn carriage 100 so as to return cable 12 to alignment position 305 and for directing pitch servoed motor 162 to move pitch carriage 200 so as to return cable 12 to alignment position 305. A lens or mask 936, attached to projection 337 or to laser 931, includes a lens or a small orifice 937, for passage therethrough of laser beam 932 for producing more narrow beam 933 such that narrow beam 933 produces a smaller dot on CCD array 935, as is well known in the art. Laser sensor 930 is enclosed and protected from dust and dirt in a flexible bag, such as anti-dust bag 999, shown in diagrammatic representation.

Figure 19:
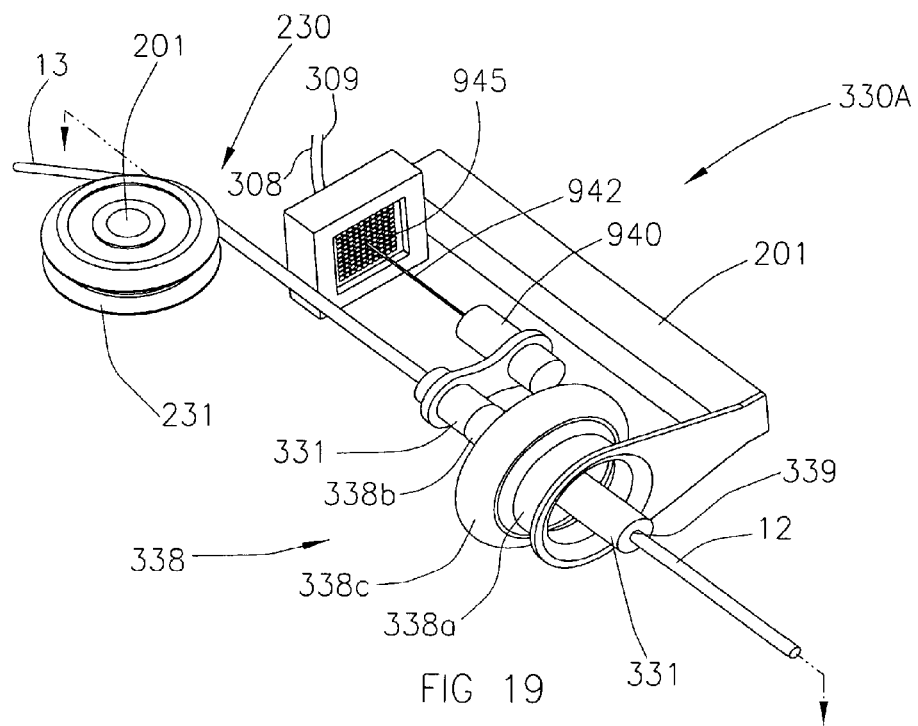
FIG. 19 is a perspective view of an eighth embodiment of the cable angular displacement sensor including a laser sensor and an elastomeric cable follower.
Figure 20:
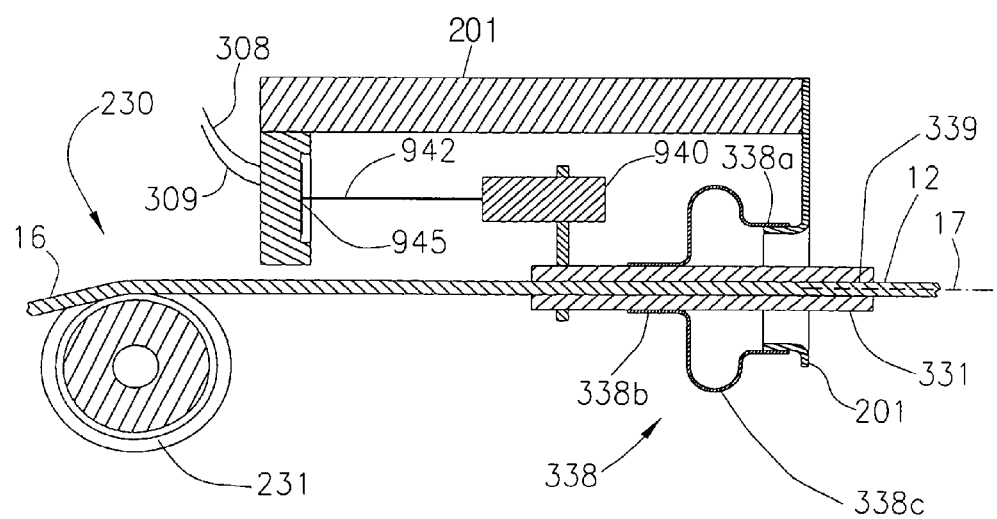
FIG. 20 is an enlarged top view, partially in cross section, of the cable angular displacement sensor of FIG. 19.

FIG. 19 is a perspective view of an eighth embodiment of cable angular displacement sensor assembly 300A wherein cable passage assembly 330A includes cable passage member 331 mounted to frame 201 on a resilient, flexible support member, such as on an elastomeric support tube 338. Elastomeric support tube 338 is sometimes called a rolling diaphragm. FIG. 20 is a partial, enlarged, top view, partially in cross section, of cable angular displacement sensor assembly 300A of FIG. 18. A rolling diaphragm, such as elastomeric support tube 338, allows motion radially, yet resists turning about its central axis. Other elastomeric embodiments could also be used, such as a rubber block.

Elastomeric support tube 338 includes a first end 338a connected to frame 201, a second end 338b mounting cable passage member 331 and a flexible wall 338c therebetween. Cable passage member 331 is mounted in second end 338b of elastomeric support tube 338 such that cable 12 passes through tube 338. Tube wall 338c supports tube second end 338b such that it can move relative to first end 338a and such that second end 338b movably supports cable passage member 331 such that, as confined cable passage 339 aligns with local longitudinal axis 17 of cable 12 with movement of cable 12 out of alignment position 305, cable passage member 331 moves in the direction of cable movement.

A light source, such as laser 940, is mounted to cable passage member 331 such that laser beam 942 emitted by laser 940 parallels local longitudinal axis 17 of cable 12 at confined passage 339. A laser beam sensor, such as a CCD array 945, is mounted on frame 201. Array 945 receives laser beam 942, detects motion of laser beam 942 away from the cable alignment position 305 and produces a signal or signals, such as on signal lines 308 and 309, indicative thereof for directing turn servoed motor 122 to move turn carriage 100 so as to return cable 12 to alignment position 305 and for directing pitch servoed motor 162 to move pitch carriage 200 so as to return cable 12 to alignment position 305.

Alternatively, the movement of a projection (not shown) of cable passage member 331 and paralleling local longitudinal axis 17 of cable 12 could be detected by sensors, such as optical sensors 385a described with respect to FIG. 17, to provide signals indicative of cable movement.

Figure 21:
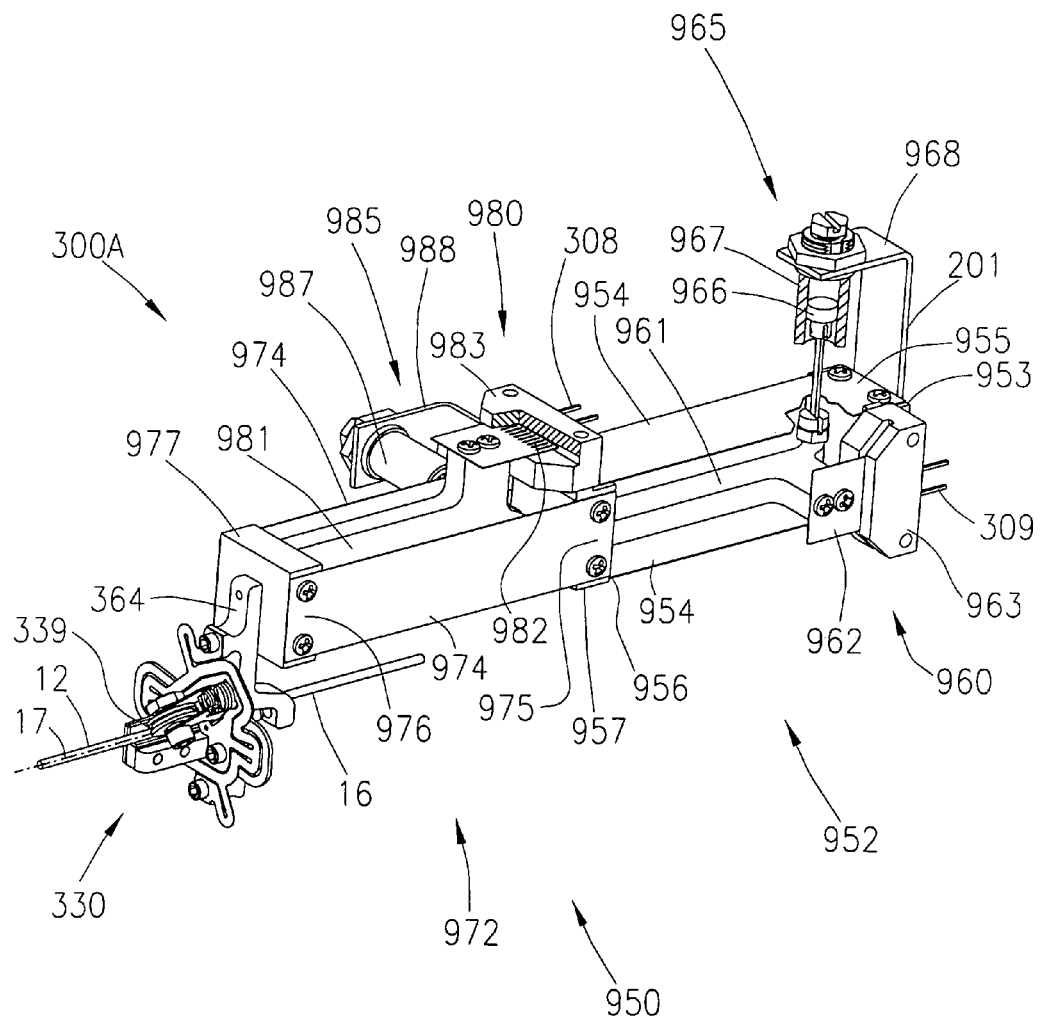
FIG. 21 is a perspective view of a ninth embodiment of the cable angular displacement sensor including a two axis, cantilever spring assembly.

FIG. 21 is a perspective view of a ninth embodiment of the cable angular displacement sensor 300A including a two axis, cantilever spring assembly 950 mount for cable passage assembly 330.

Cantilever spring assembly 950 includes a first axis assembly 952 connected to frame 201 providing for movement of cable passage assembly 330 in a first axis; and further includes a second axis assembly 972 connected to first axis assembly 952 providing for movement of cable passage assembly 330 in a second axis.

First axis assembly 952 includes a stationary frame end 953 mounted to frame 201, single axis, cantilever spring means with relative movement in a first axis, such as first pair of parallel, flat springs 954 each having a first end 955 connected to stationary frame end 953 and a second end 956 connected to first moving frame 957 such that, as first springs 954 bend, first moving frame 957 can move perpendicular to the plane of flat springs 954 relative to frame 201.

Second axis assembly 972 includes single axis, cantilever spring means with relative movement in a second axis, such as second pair of parallel, flat springs 974 each having a first end 975 connected to first moving frame 957 and a second end 976 connected to second moving frame 977 such that, as second springs 974 bend, second moving frame 977 can move perpendicular to the plane of flat springs 974 relative to first moving frame 957. Thus, second moving frame 977 can move in both axes.

Cable passage assembly 330 is attached, such as by bracket 364, to second moving frame 977. Cable passage assembly 330, shown, is like that shown and described in FIGS. 4A, 4B, 5, and 7 and includes a confined cable passage 339 for passage of incoming cable 12. However, other configurations of cable passage assembly 330, such as those shown herein, could be used.

Midsection 16 of incoming cable 12 is shown in the alignment position 305 wherein the local longitudinal axis 17 of cable 12 is aligned with main datum passage 230. With movement of cable 12 out of alignment position 305, confined cable passage 339 aligns with local longitudinal axis 17 of cable 12 and moves cable passage member 331 in the direction of cable movement by the deflection of springs 954, 974.

A first axis angular displacement sensor 960 detects relative movement of first moving frame 957 and stationary frame end 953 and sends a signal, such as on line 309, indicative thereof. A second angular displacement sensor 980 detects relative movement of second moving frame 977 and first moving frame 957 and sends a signal, such as on line 308, indicative thereof. In response to signals in lines 308, 309, servoed motor 122 moves turn carriage 100 so as to return cable 12 toward alignment position 305 and pitch servoed motor 162 moves pitch carriage 200 so as to return cable 12 toward alignment position 305.

In the exemplary embodiment, displacement sensors 960, 980 are of the arm-and-reader type as used in the first embodiment of FIGS. 2, 3, 4A, 4B, 5, 6, 7, and 8 and each comprises an arm attached to one of the relative moving members and extending toward the other relative moving member and an optical encoder reading displacement between the end of the arm and the other member.

First axis displacement sensor 960 includes arm 961 projecting from first moving frame 957 toward stationary frame end 953. An encoder strip 962 on end of arm 961 is read by encoder read head 963 on stationary frame end 953 or frame 201 and a signal indicative of the relative movement is output on line 309.

As an option, a first dash pot, such as first air pot 965, is connected between the free end of arm 961 and mount 968 mounted on frame 201 and dampens relative movement of stationary frame end 953 and first moving frame 957. First air pot 965 includes a piston 966 moving in an air cylinder 967, as is known in that art. Other types of dampener, such as hydraulic, could be used.

Second axis displacement sensor 980 includes arm 981 projecting from second moving frame 977 toward first moving frame 957. An encoder strip 982 on end of arm 981 is read by encoder read head 983 on first moving frame 957 and a signal indicative of the relative movement is output on line 308.

As an option, a second dash pot, such as second air pot 985, is connected between the free end of arm 981 and mount 988 mounted on first moving frame 957 and dampens relative movement of first moving frame 957 and second moving frame 977. Second air pot 985 is similar to first air pot 965 and includes a piston, not seen, moving in an air cylinder 987, as is known in that art. Other types of dampener, such as hydraulic, could be used.

Displacement sensors 960, 980 can be any desirable type of displacement sensor, such as shown herein. Also, other configurations of cantilever spring assembly 950 are possible. An axis assembly 952, 972 could have just a single spring. Also, axis assemblies 952, 957 can double back on one another so as to shorten spring assembly 950.

Figure 22:
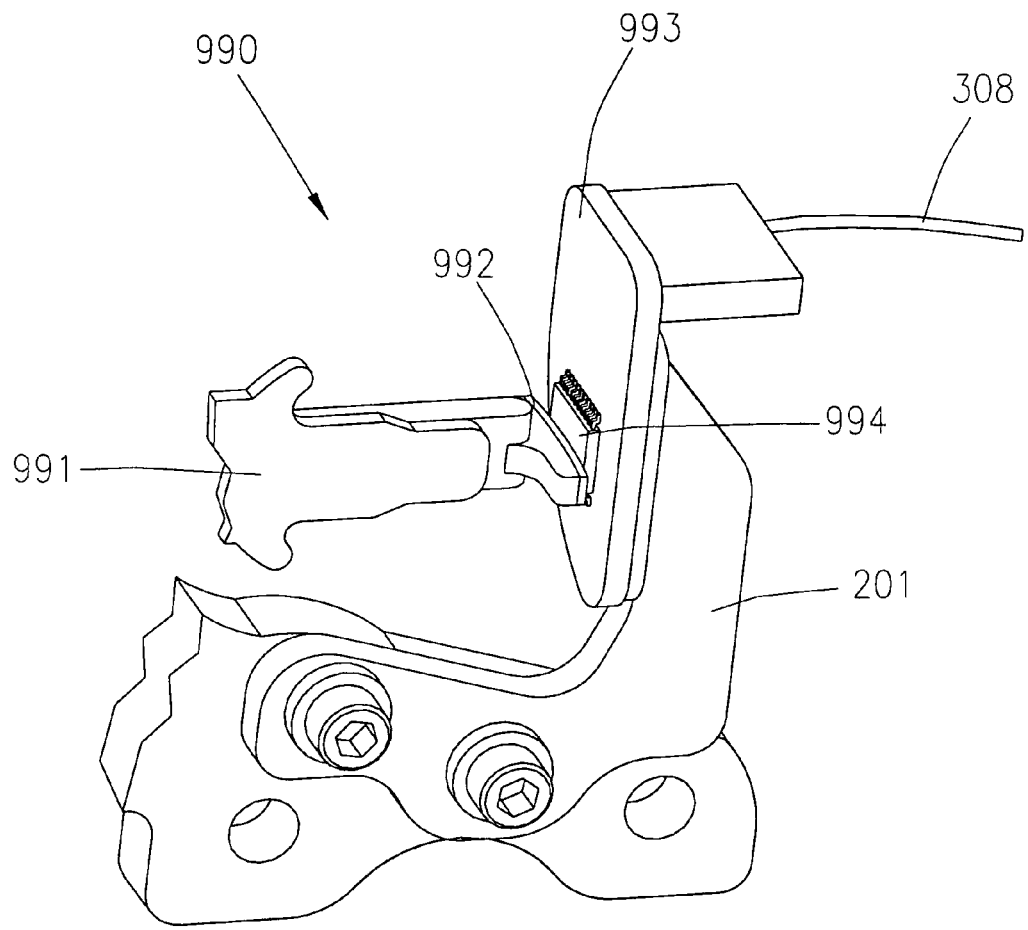
FIG. 22 is a perspective view of a tenth embodiment of the cable angular displacement sensor including a magnetic linear encoder.

FIG. 22 is a perspective view of a tenth embodiment of cable angular displacement sensor of the arm and sensor type including a magnetic encoder, such as magnetic linear encoder 990. Magnetic linear encoder 990 can be substituted for an optical encoder, such as for encoder 409, 416 of the first embodiment shown in FIG. 4A herein. Magnetic linear sensor 990 includes a multi-pole magnetic strip 992 on angular displacement arm 991 and an encoder head 993, including a Hall-effect sensing integrated circuit chip 994 for sensing movement of magnetic strip 992 in an axis and producing a signal on line 308 indicative thereof.

A suitable encoder 990 is the AS5311 high resolution magnetic linear encoder made by AustriaMicroSystems of Schloss Premstaetten, Austria. This encoder has a resolution as small as 1.95 μm so it can detect minute movements of arm 991.

Figure 23:
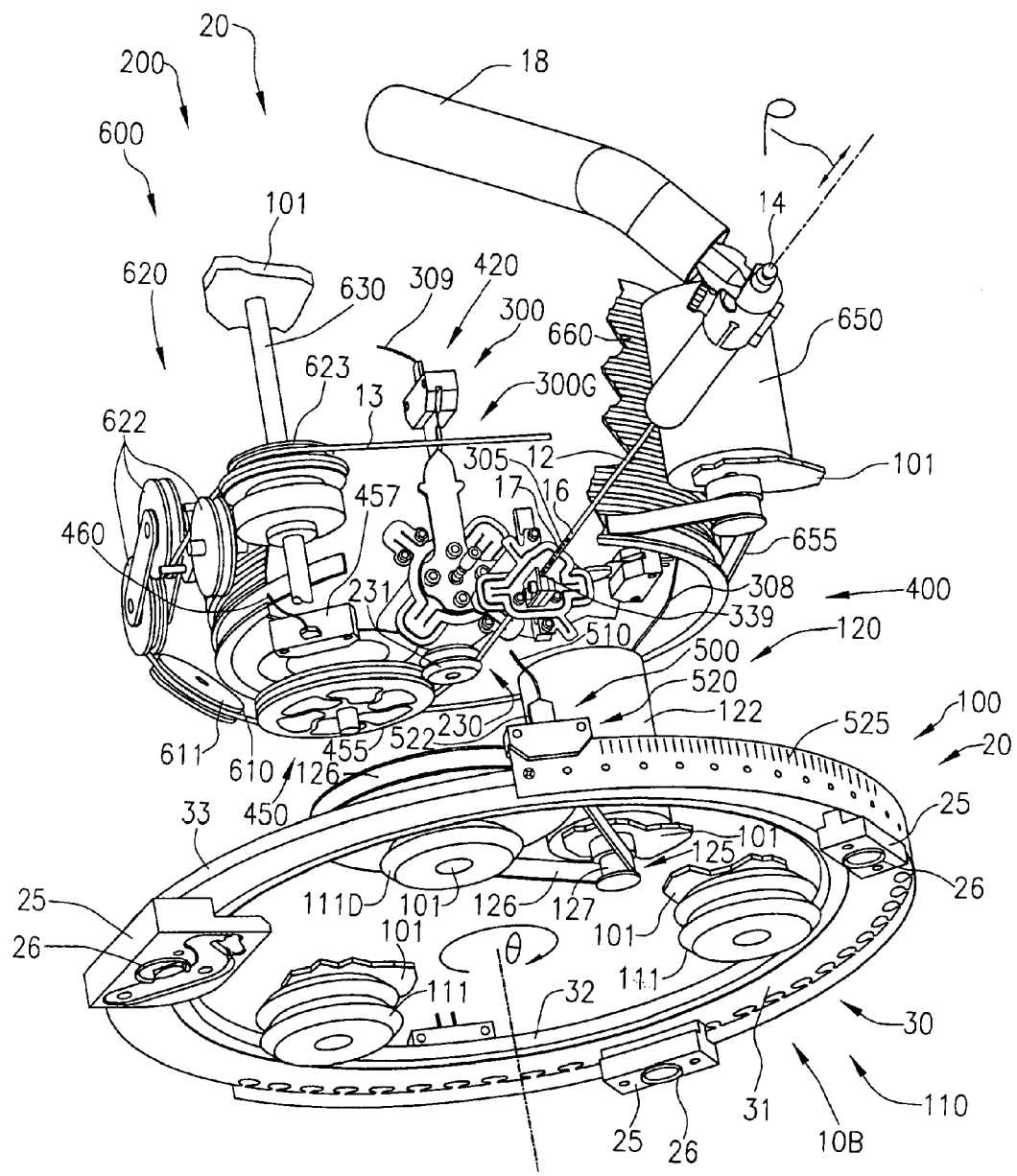
FIG. 23 is bottom, front, left side; partially cut away, perspective view similar to FIG. 3 of selective elements of an alternative embodiment of the measuring device including only one carriage.

FIG. 23 is a bottom, front, left side, partially cut away, perspective view of selective elements of a single carriage embodiment 10B of device 10 as was shown and described primarily with respect to FIGS. 2 and 3. Measuring device 10B is similar to device 10 in most respects but differs as described below from device 10 in that there is only one carriage, such as turn carriage 200. Many elements that are mounted on pitch carriage 200 in device 10 are instead mounted on turn carriage 100 in device 10B. In the exemplary embodiment, device 10B includes a first displacement sensor, such as turn sensor 400, and a second angular displacement sensor, such as pitch sensor, 420. A simplified version of device 10B may omit pitch sensor 420. A light pointer, such as measuring laser pointer 270 producing laser beam 271, is attached to turn frame 201.

Device 10B can measure points in a plane that is close to ring 31 of base 30 and that is perpendicular to turn axis θ. Device 10B can measure these points with precision if the pitch axis sensor range is not exceeded or, otherwise, with sufficient accuracy for many applications. For example, device 10B can be used to measure flooring, such as tiles.

Main datum passage 230, cable supply means 600, cable length measuring means 450, and angular displacement sensor assembly 300 are attached to frame 101. Although a gimbaled angular displacement sensor 300G is shown, other angular displacement sensors, such as those shown and described herein, could be used.

Cable 12 is in alignment position 305 when the local longitudinal axis 17 of cable 12 at outer confined cable passage 339 is aligned with turn axis (θ). As cable free end 14 is moved from an old point to a new point that is not directly radially outward from the old point, cable midsection 16 is displaced angularly in angular displacement sensor assembly 300. Angular displacement sensor assembly 300 detects this angular displacement of cable 12 away from alignment position 305 and produces a signal or signals indicative thereof, such as on lines 308 and 309. Turn servoed motor assembly 120 rotates turn carriage 100 about turn axis θ responsive to the signals from angular displacement sensor assembly 300 indicative of cable displacement about turn axis (θ) so as to move angular displacement sensor assembly 300 to alignment position 305.

As discussed with respect to device 10; in device 10B, the location of the measured point is determined from turn-carriage measuring means 500, cable length measuring means 450, and pitch angle from the signals from angular displacement sensor assembly 300 indicative of pitch angle, such as on line 309.

Figure 24:
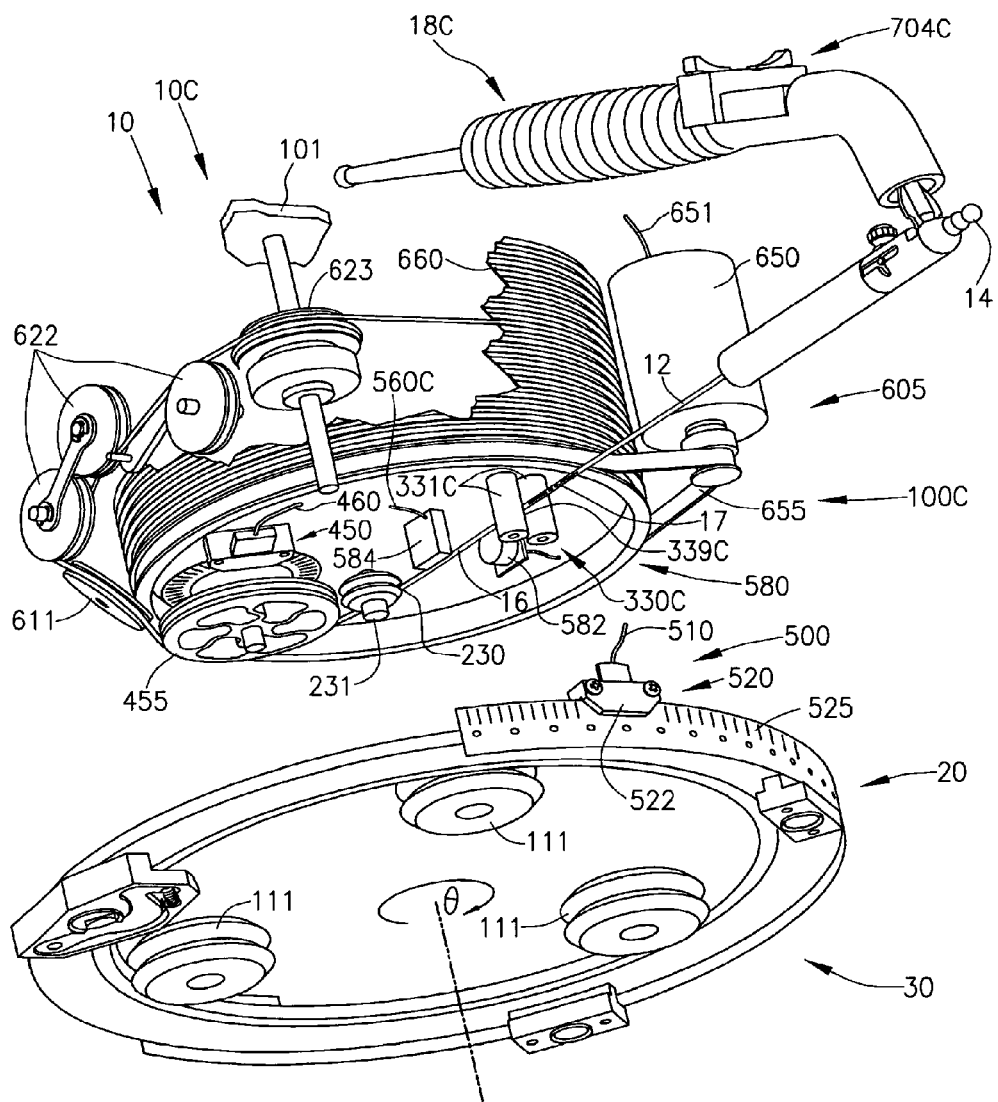
FIG. 24 is bottom, front, left side, partially cut away perspective view of an alternate embodiment of the device of FIG. 23.

FIG. 24 is bottom, front, left side, partially cut away perspective view of an alternate embodiment 10C of the device 10B of FIG. 23. Device 10C has a single carriage, that is first or turn carriage 100C, including a frame 101 rotationally mounted, such as by wheels 111, on base 30 of base unit 20 so as to rotate about turn axis θ (theta). Most of frame 101 is not shown in FIG. 24 for clarity, but can be seen in FIG. 3.

As previously described, main datum passage 230 is attached to turn carriage 100 for confined passage of midsection 16 of cable 12. In incoming cable passage assembly 330C is attached to turn carriage 100 and includes a pair of incoming cable passage members 331C defining a confined incoming cable passage 339C between main datum passage 230 and cable free end 14 providing passage of midsection 16 of cable 12 constrained tangentially to, i.e. orthogonal to radials of, turn axis θ. Cable 12 is in an alignment position when local longitudinal axis 17 of cable 12 in incoming datum passage 339C is radially aligned with main datum passage 230. Turn carriage 100 freely rotates about turn axis θ to the alignment position responsive to tangential force of cable 12 on members 331C of incoming cable passage 339C.

From main datum passage pulley 231, incoming cable 12 passes over a plurality of pulleys 455, 611, 622, 623 mounted to frame 101 before being fed onto cable storage reel 660 rotatably mounted on frame 101 as seen in FIG. 2. Cable tensioning means 605 attached to base unit 20, such as reel servo motor 650 attached to frame 101, adjusts the force required to move cable free end 14 away from base unit 20. In the exemplary embodiment, reel servoed motor 650 applies a tension to cable 12 by using belt 655 to rotate reel 660. The amount of electric current on line 651 to reel servoed motor 650 determines the torque of reel servoed motor 650 and, thus, the tension in cable 12.

In the exemplary embodiment, incoming cable passage assembly 330C includes cable angle measuring means, such as pitch measuring means 580, for measuring the angle or change of angle of cable 12 at incoming cable passage 339C in a plane parallel to turn axis θ and for producing a pitch signal, such as on line 560C, indicative thereof. In the exemplary embodiment, a light source 582 disposed on one side of cable 12 emits light, and a light sensor 584 for receiving the emitted light is disposed on the other side of cable 12. Light sensor 584 may include a CCD array or other light detector as is well known. One or more lenses, not shown, may be used to focus or magnify the light for accurate reading. Light sensor 584 detects when the shadow of cable 12 moves up or down and produces a signal, such as on signal line 560C, indicative thereof.

Although, optical pitch measuring means 580 is shown with reference to the single carriage positioning device 10C, alternate devices, such as those shown in FIGS. 4a, 10, 11, 14, and 17-21 adapted for a single axis, could be used.

Figure 25:
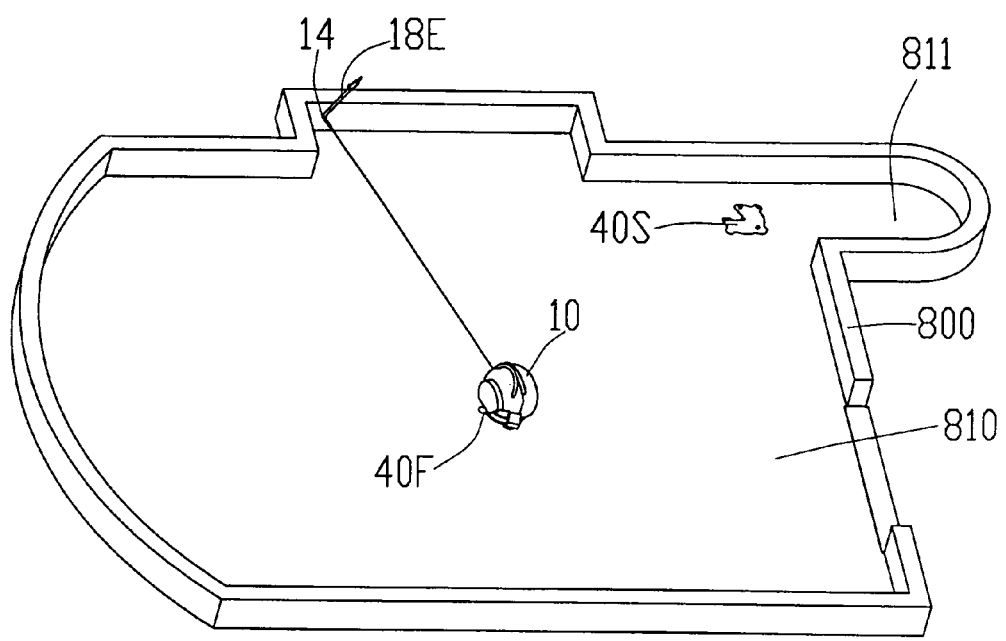
FIG. 25 is perspective diagram showing a device 10 measuring to create a design.

Each of the above-described devices 10A, 10B and 10C has an input mode wherein it may be used as an input/measuring device and has an output mode wherein it can be used an output/positioning device. FIG. 25 is perspective diagram showing a device 10 measuring the floor 810 of room 800 to create a design 760 (FIG. 26) of floor 810, and FIG. 26 is a perspective view of device 10 positioning a mirror image of the acquired design 760 of floor 810 on the back of a workpiece 750, such as a sheet of carpet material 751 such that carpet can be cut to exactly fit floor 810.

In FIG. 25, base unit 20 is placed on first support 40F. The user places base unit 20 in input mode, places cable free end 14 along the edge of floor 810 and measures points as described with respect to FIG. 1 along the edge of floor 810 to define design 760 of outline of floor 810. An elongate extension grip 18E may be used to place cable end 14 along the floor outline so that the user does not need to bend down or crawl. If a portion of floor 810, such as alcove 811, is not in line of sight of device 10 on first support 40F, then device 10 is moved to second support 40S that is in line of sight of alcove 811 to measure alcove 811 as described with respect to FIG. 1. Measured design 760 of floor 810 is now in computer 700 and can be used and manipulated as any CAD design. For example, the measured design may be adjusted for shrinkage or stretching of material before being positioned on material 751.

Figure 26:
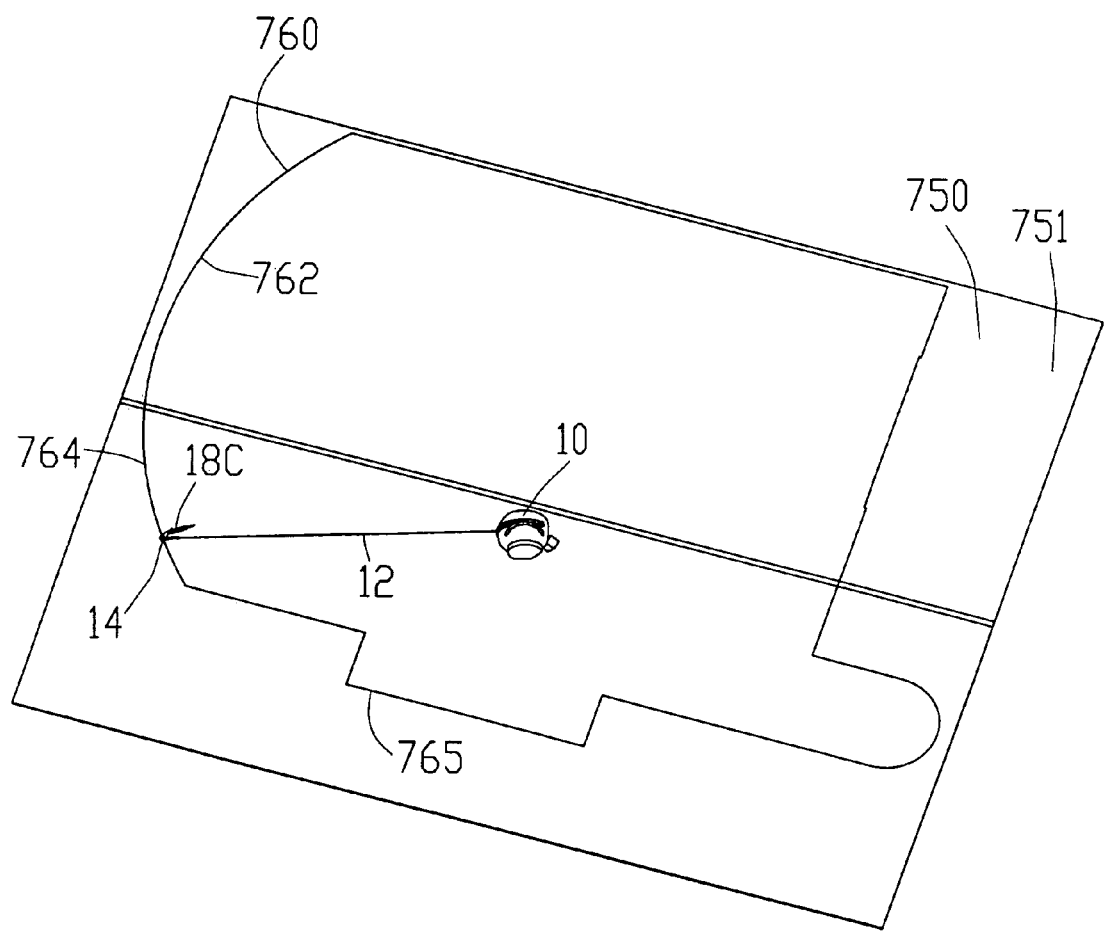
FIG. 26 is a perspective view of device 10 positioning an acquired design on a workpiece.

In FIG. 26, base unit 20 is placed in line of sight of workpiece 750 at any position and orientation relative to workpiece 750. The position and orientation can be established by using device 10 to measure known points on workpiece 750 or by using pre-established set positions for workpiece 750 and base unit 20.

Using device 10C of FIG. 24 as the positioning device, in the output mode with cable 12 in tension, computer 700 always knows the position of cable end 14 on workpiece 750 from the turn carriage signal and the cable length signal and either the pitch signal or the known height of base unit 20 relative to workpiece 750. User uses an input device, such as PDA to select a portion 762 of design 760 to position, such as by marking, on workpiece 750.

Figure 27:
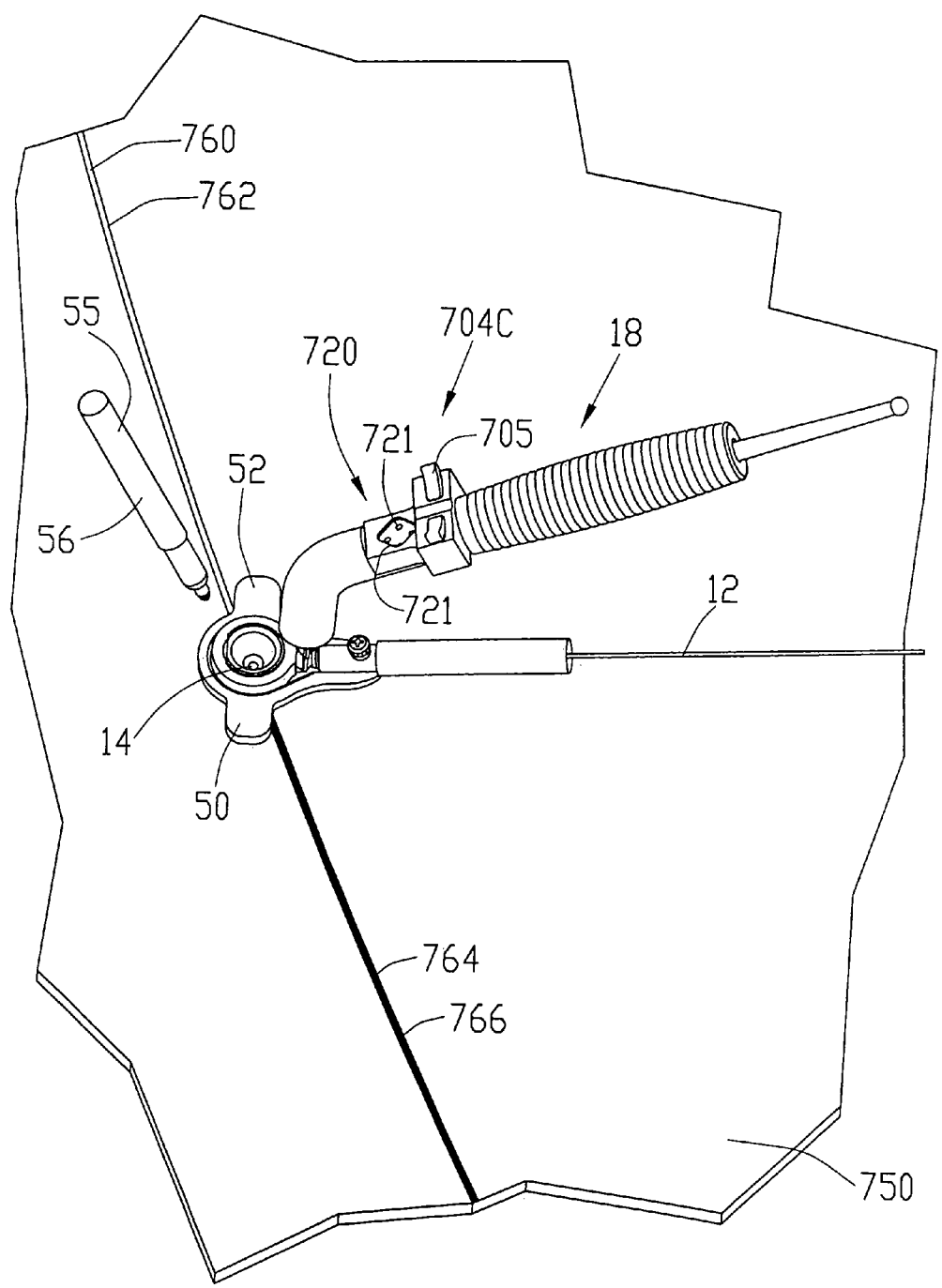
FIG. 27 is an enlarged perspective view of an alternate cable grip 18 incorporating a user interface and cable direction display.

The user is directed to move cable free end 14 orthogonally to cable 12 toward selected portion 762 of design 760 by cable direction means, such as audio signals or direction indication 720 on the display of the PDA 701 (FIG. 1) or on cable grip 18, as shown in FIG. 27. FIG. 27 is an enlarged perspective view of an alternate cable grip 18C incorporating a user interface 704C and cable direction indication 720 in communication with computer 700, such as by BLUETOOTH®. Cable direction indication 720, such as LEDs 721, directs the user to move cable free end 14 to the right or to the left, or up or down or in and out. The selected portion 762 of the design may be a single point or may be a larger design element such as are 764 or line 765.

Turn carriage 100C freely pivots to the alignment position responsive to force of cable 12 on incoming datum passage 339C.

Computer 700 directs user to move radially in or out until free end 14 is at the distance to selected point. The preferred method of doing this is by changing the tension in cable 12 so as to be discernable to the user. Computer 700 directs reel servoed motor 650 to apply a first tension, such as half a pound, to cable 12 when free end 14 is located less than the distance to selected design portion 762 and a second tension, such as higher tension, such as two pounds, when cable free end 14 is at the selected distance and beyond. The user applies a tension between these two levels, such as one pound. If the cable is too long, the second tension from the motor will exceed the force of the user's hand and pull end 14 inward. If the cable is too short, the force from the user's hand will exceed the first tension and pull end 14 outward. Thus, motor 650 servos cable end 14 to a specific length corresponding to a point design 760.

Figure 28:
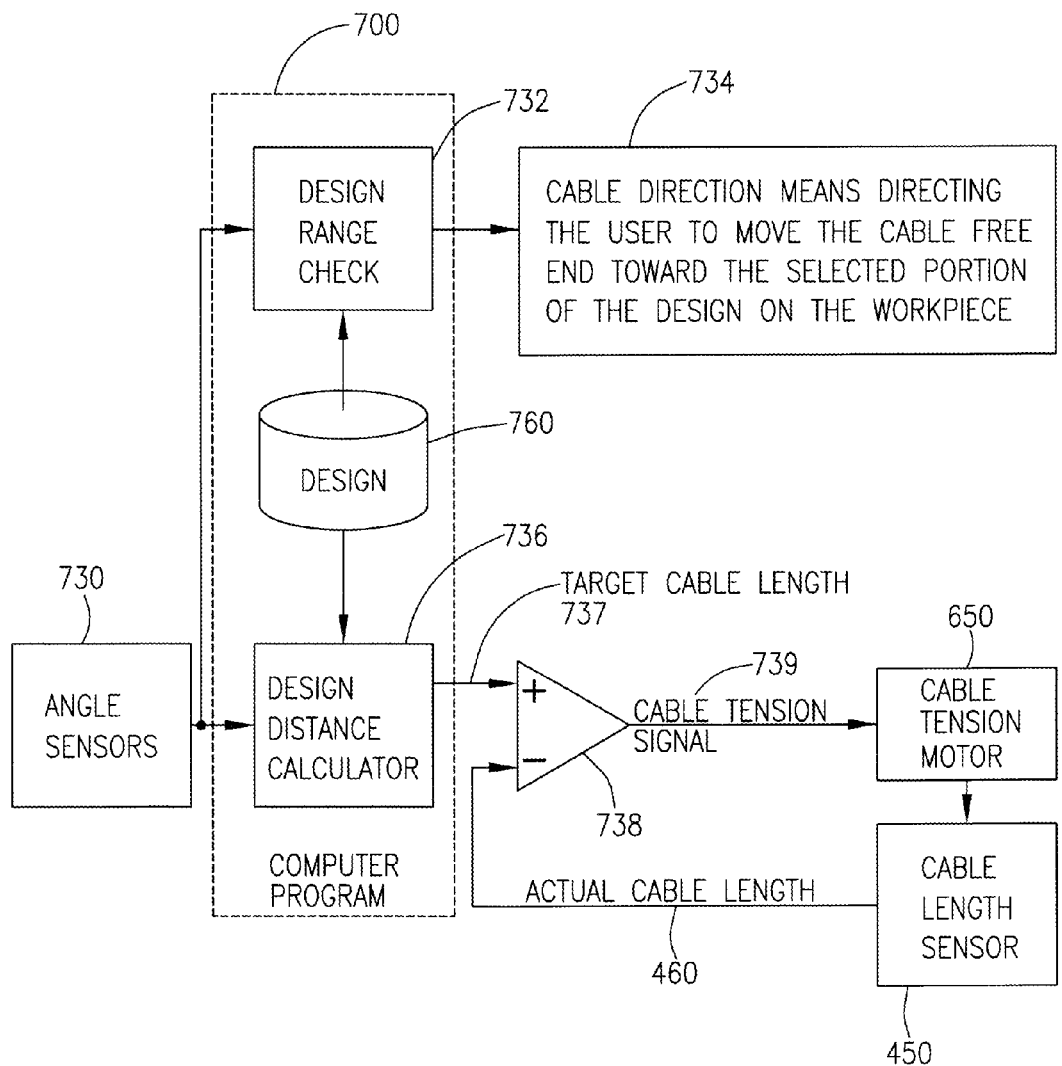
FIG. 28 is a diagram of a cable free end positioning function.

FIG. 28 is a schematic representation of this portion of the system's operation. The block marked Angle Sensors 730 represents any combination of sensors for determining the pitch and yaw of carriages 100, 200 and, hence, of cable 12, in two dimensions, such as pitch measuring means 580 and first carriage measuring means 500 of FIG. 24. A computer 700, such as PDA 701 of FIG. 1, receives signals from the angle sensors. Computer 700 also stores a design 760 and a selected portion 762 of the design 760 to be positioned. The portion of the computer's program marked Design Range Check 732 produces a signal for directing the user to move cable free end 14 into the range of angles encompassed by portion 762 of the design to be positioned. The block marked Cable Direction Means 734 represents any indication means used to communicate this direction signal to the user, such as LED's 721 of FIG. 27. The portion of the computer's program marked Design Distance Calculator 736 determines the length of cable necessary to place cable free end 14 on design 760 at the current angle. This sub-program produces a length signal 737. A comparator block 738 produces a cable tension signal 739 by comparing this target length signal with the cable's current length signal. Cable tension motor 650 responds to cable tension signal 739 by placing the corresponding tension on the cable. Finally, cable length sensor 450 determines the cable's current length signal 460 to complete the feedback loop.

When the indicators 704, 721 show cable free end 14 is at the design position, the position of cable free end 14 may be indicated, such as by marking, on workpiece 750. Returning to FIG. 27, a marking device 50 is attached to cable 12 for marking the end of cable 14 on planar surfaces. Marking device 50 includes a sliding surface 52 for sliding over workpiece 750 and marker 55 for marking workpiece 750 at end of cable 14. Marking device 50, as shown, includes a bore therethrough at end of cable 14 position for receiving a marker 55 in the form of a marking pen 56. Other markers 55 may be used as desired. For example, a spring-loaded center punch can be used to mark points for drilling in metal.

The user may use interface 704C, such as depressing button 705, to direct computer 700 to continuous position mode in which computer 700 continuously directs user to adjacent points on selected design 760. As seen in FIG. 27, in continuous position mode, the user maintains the tension at the low/high intersection and moves left or right as directed such that a continuous marked line 766 of design 760 can be drawn.

As seen in FIGS. 25 and 26, one device 10 may measure room 800 and the measured design may be sent electronically to a carpet seller where a second device 10 positions the design on the carpet where it can be cut and rolled for delivery to room 800.

Using device 10B of FIG. 23 as the positioning device in the output mode with design portion selected and cable 12 in tension; computer 700, responsive to the turn carriage measurement signal on line 510, is programmed to direct the cable direction means to direct the grip user to move cable free end 14 to the selected design portion 762 for marking. As cable 12 is moved by the user, turn carriage servoed motor 650 turns turn carriage 100 to track movement of cable 12 responsive to the turn signal from angular displacement sensor 300. Cable direction means may also indicate when cable free end 14 is at a selected point or within a predetermined distance therefrom. Computer 700 directs reel servoed motor 650 to adjust cable tension as described above.

In an alternate method of using device 10B of FIG. 23 as the positioning device in the output mode with design portion selected and cable 12 in tension; computer 700 is programmed to direct turn motor 122 to rotate turn carriage 100 to a target position wherein incoming cable passage 339 and main datum passage 230 are radially aligned with the selected portion 762 of design 760, to direct reel servoed motor to adjust cable tension as described above; and, responsive to the displacement signal from angular displacement sensor 400, to direct the cable direction means to direct the grip user to move cable free end 14 to the selected design portion 762 for marking.

Using device 10A of FIGS. 2 and 3 as the positioning device in the output mode with design portion selected and cable 12 in tension, computer 700 is programmed, responsive to the turn carriage measurement signal on line 510 and pitch carriage measurement signal on line 560, to direct the cable direction means to direct the grip user to move cable free end 14 to the selected design portion 762 for marking. As cable 12 is moved by the user, turn carriage servoed motor 650 turns turn carriage 100 and pitch carriage servoed motor 162 turns pitch carriage 200 to track movement of cable 12 responsive to the turn and pitch signals from angular displacement sensor 300. Cable direction means may also indicate when cable free end 14 is at a selected point or within a predetermined distance therefrom. Computer 700 directs reel servoed motor 650 to adjust cable tension as described above.

In an alternate method of using device 10A of FIGS. 2 and 3 as the positioning device in the output mode with design portion selected and cable 12 in tension, computer 700 is programmed to direct turn servoed motor 122 to rotate turn carriage 100 and pitch servoed motor 162 to rotate pitch carriage 200 to a target position wherein incoming cable passage 339 and main datum passage 230 are aligned with the selected portion 762 of design 760, to direct reel servoed motor to adjust cable tension as described above; and, responsive to the displacement signal from angular displacement sensor 400, to direct the cable direction means to direct the grip user to move cable free end 14 to the selected design portion 762 for marking.

Distances longer than the length of cable 12 may be measured by connecting a laser micrometer to the end of cable 12 and holding it, such as by grip 18, such that the emitted laser beam is parallel to cable 12 and the beam lands on the point being measured. The distance indicated by the laser micrometer is added to the cable distance to attain total distance.

Another method of measuring points at longer distances is to attach a distance measuring laser to base unit 20. User 90 may be positioned near the point to he measured and use means, such as a PDA with BLUETOOTH® to drive the turn and pitch servos to place the laser light on the point and take a measurement.

Device 10 can be used to measure artwork or blueprints and then scale up or scale down or even project the measured points on a surface, such as a wall.

Cable 12 preferably has a low and known strain. A wire cable of about one sixteenth inch diameter and having a breaking strength of about 300 pounds has been used. Temperature, humidity, and level sensors may be included to improve accuracy. Although cable 12 is shown and described as a traditional cable having a circular cross section, cable 12 could have a different cross section, such as rectangular tape or polygonal shape.

From the foregoing description, it is seen that the present invention provides an extremely convenient and accurate positioning device that can be operated by a single user.

In the following claims, the work "pitch" is used in a relative sense and not in an absolute, earth-reference sense.

We claim:

1. A positioning device for positioning a portion of a design on a workpiece comprising:
   a cable including:
     a supply end;
     a midsection; and
     a free end for placement by a user;
   a base unit having a known position and orientation relative to the workpiece including:
     a base;
     a first carriage rotationally attached to said base so as to be rotatable about a first axis including:
       a main datum passage attached to said first carriage for confined passage of said midsection of said cable;
       an incoming cable passage assembly attached to said first carriage including:
         an incoming cable passage between said main datum passage and said cable free end providing confined passage of said midsection of said cable; said cable being in an alignment position when the local longitudinal axis of said cable in said incoming datum passage is radially aligned with said main datum passage;
     first carriage measuring means on said base unit for measuring the rotational position or change of rotational position of said first carriage relative to said base and for producing a first carriage signal indicative thereof; and
     cable measuring means attached to said base unit and coupled to said cable for measuring the length or change of length of said cable and for producing a cable signal indicative thereof;
     a cable tensioning motor attached to said base unit for adjusting the force required to move said cable free end away from said base unit;
   cable direction means for directing a user to move said cable free end toward the portion of the design on the workpiece; and
   a computer including a program and memory including the design; wherein said device has an output mode for positioning the portion of the design on a workpiece wherein:
   said first carriage freely rotates to the alignment position responsive to force of said cable on said incoming datum passage; and
   said computer is programmed: responsive to the first carriage signal from said first carriage measuring means, for directing said cable direction means to direct the user to move said cable free end toward the portion of the design; responsive to the cable signal from said cable measuring means, for directing said cable tensioning motor to adjust the tension in said cable sufficiently to indicate when cable free end is at a distance to the portion of the design.

2. The device of claim 1 further including:
   user input means in communication with said computer for selecting the portion of the design to be positioned on the workpiece.

3. The positioning device of claim 1 wherein:
   said incoming cable passage assembly includes:
     pitch measuring means for measuring the angle or change of angle of said cable in a plane parallel to the first axis and for producing a pitch signal indicative thereof; and
   in the output mode, said computer is further programmed, responsive to the pitch signal, for directing said cable direction means to direct the user to move said cable free end in the plane toward the portion of the design.

4. A method for positioning a portion of a design on a workpiece with a positioning device comprising: a cable including: a supply end; a midsection; and a free end for placement by a user; a base unit having a known position and orientation relative to the workpiece including: a base; a first carriage rotationally attached to the base so as to be rotatable about a first axis including: a main datum passage attached to the first carriage for confined passage of the midsection of the cable; an incoming cable passage assembly attached to the first carriage including: an incoming cable passage between the main datum passage and the cable free end providing confined passage of the midsection of the cable; the cable being in an alignment position when the local longitudinal axis of the cable in the incoming datum passage is aligned with the main datum passage; first carriage measuring means on the base unit for measuring the rotational position or change of rotational position of the first carriage relative to the base and for producing a first carriage signal indicative thereof; cable measuring means attached to the base unit and coupled to the cable for measuring the length or change of length of the cable and for producing a cable signal indicative thereof; and a cable tensioning motor attached to the base unit for adjusting the force required to move the cable free end away from the base unit; cable direction means for directing a user to move the cable free end toward the portion of the design on the workpiece; and a computer including a program and memory including the design; wherein the device has an output mode for positioning the portion of the design on a workpiece wherein: the first carriage freely rotates to the alignment position responsive to force of the cable on the incoming datum passage; and the computer is programmed:

responsive to the first carriage signal from the first carriage measuring means, for directing the cable direction means to direct the user to move the cable free end toward the portion of the design; responsive to the cable signal from the cable measuring means, for directing the cable tensioning motor to adjust the tension in the cable sufficiently to indicate when cable free end is at a distance to the portion of the design; comprising the steps of:

responsive to the direction from the cable direction means, moving the cable free end tangentially toward the portion of the design, and moving the cable free end radially to the first axis to a point of cable tension adjustment indicative that the free end is a distance to the portion of the design.

5. The method of claim 4; the device further including user input means in communication with the computer for selecting the portion of the design to be positioned on the workpiece; further including the step of:

selecting the portion of the design to be positioned on the workpiece.

6. The method of claim 4 wherein the incoming cable passage includes: pitch measuring means for measuring the angle or change of angle of the cable in a plane parallel to the first axis and for producing a pitch signal indicative thereof; and in the output mode, the computer is further programmed, responsive to the pitch signal, for directing the cable direction means to direct the user to move the cable free end in the plane toward the portion of the design; further comprising the step of:

responsive to the direction from the cable direction means, moving the cable free end radially in the plane toward the portion of the design.

7. A positioning device for positioning a portion of a design on a workpiece comprising:

a cable including:
        a supply end;
        a midsection; and
        a free end for placement by a user;
    a base unit having a known position and orientation relative to the workpiece including:
        a base;
        a first carriage rotationally attached to said base so as to be rotatable about a first axis including:
            a main datum passage attached to said first carriage for confined passage of said midsection of said cable;
            an angular displacement sensor assembly attached to said first carriage including:
                an incoming cable passage assembly including:
                    an incoming datum passage between said main datum passage and said cable free end for confined passage of said midsection of said cable; said cable being in an alignment position when the local longitudinal axis of said cable in said incoming datum passage is aligned with said main datum passage; said device being in the target position when said incoming datum passage and said main datum passage are radially aligned with the portion of the design; said angular displacement sensor assembly for sensing angular displacement of said cable away from the alignment position and for producing a displacement signal indicative thereof;
        a first motor coupled to said first carriage for rotating said first carriage about the first axis;
    first carriage measuring means on said base unit for measuring the rotational position or change of rotational position of said first carriage relative to said base and for producing a first carriage signal indicative thereof;
    cable measuring means attached to said base unit and coupled to said cable for measuring the length or change of length of said cable and for producing a cable signal indicative thereof; and
    a cable tensioning motor attached to said base unit for adjusting the force required to move said cable free end away from said base unit;
    cable direction means for directing a user to move said cable free end toward the portion of the design on the workpiece; and
    a computer including a program and memory including the design; wherein said device has an output mode for positioning the portion of the design on a workpiece wherein:
    said computer is programmed: responsive to the first carriage signal from said first carriage measuring means, for instructing said first motor to rotate said first carriage to the target position; responsive to said cable signal from said cable measuring means, for directing said cable tensioning motor to adjust the tension in said cable sufficiently to indicate when cable free end is at a distance to the portion of the design; and, responsive to the displacement signal from said angular displacement sensor, for directing said cable direction means to direct the user to move said cable free end toward the portion of the design.

8. The device of claim 7 further including:
user input means in communication with said computer for selecting the portion of the design to be positioned on the workpiece.

9. The positioning device of claim 7:
said computer including a pattern of the workpiece;
said device having an input mode for determining the relative position and orientation of said base unit relative to the workpiece by measuring the relative location on the workpiece of a point or points from the pattern of the workpiece, wherein, for each design point being measured upon which the user places said cable free end:
    said first motor rotates said first carriage about the first axis responsive to the displacement signal from said angular displacement sensor assembly indicative of cable displacement so as to move said angular displacement sensor assembly to the alignment position; and
    said computer means receives the cable signal and the first carriage signal for determining the relative position of the point being measured.

10. The positioning device of claim 9 wherein:
said angular displacement sensor assembly includes:
    pitch measuring means for measuring the pitch or change of pitch of said cable and for producing a pitch signal indicative thereof; and
in the input mode, said computer is further programmed for including the pitch signal for determining the relative position of the point being measured.

11. A method for determining the position of a selected point on a workpiece with a positioning device comprising: a cable including: a supply end; a midsection; and a free end for placement by a user; a base unit having a known position and orientation relative to the workpiece including: a base; a first carriage rotationally attached to the base so as to be rotatable about a first axis including: a main datum passage attached to the first carriage for confined passage of the midsection of the cable; an angular displacement sensor assembly attached to the first carriage including: an incoming cable passage assembly including: an incoming datum passage between the main datum passage and the cable free end for confined passage of the midsection of the cable; the cable being in an alignment position when the local longitudinal axis of the cable in the incoming datum passage is aligned with the main datum passage; the device being in the target position when the incoming datum passage and the main datum passage are radially aligned with the selected point; the angular displacement sensor assembly for sensing angular displacement of the cable away from the alignment position and for producing a displacement signal indicative thereof; a first motor coupled to the first carriage for rotating the first carriage about the first axis; first carriage measuring means on the base unit for measuring the rotational position or change of rotational position of the first carriage relative to the base and for producing a first carriage signal indicative thereof; cable measuring means attached to the base unit and coupled to the cable for measuring the length or change of length of the cable and for producing a cable signal indicative thereof; and a cable tensioning motor attached to the base unit for adjusting the force required to move the cable free end away from the base unit; cable direction means for directing a user to move the cable free end toward the portion of the design on the workpiece; and a computer including a program and memory including the design; wherein the device has an output mode for positioning the portion of the design on a workpiece wherein: the computer is programmed: responsive to the first carriage signal from the first carriage measuring means, for instructing the first motor to rotate the first carriage to the target position; responsive to the cable signal from the cable measuring means, for directing the cable tensioning motor to adjust the tension in the cable sufficiently to indicate when cable free end is at a distance to the portion of the design; and, responsive to the displacement signal from the angular displacement sensor, for directing the cable direction means to direct the user to move the cable free end toward the selected point; said method comprising the steps of:

placing the base unit and workpiece at a known relative position and orientation;

moving the cable free end radially to the first axis to a point of cable tension adjustment indicative that the free end is at a distance to the portion of the design responsive to the cable direction means, moving the cable free end until the cable direction means indicates that the cable free end is at the selected point.

12. The method of claim 11; the device further including user input means in communication with said computer for selecting the portion of the design to be positioned on the workpiece; further including the step of:

selecting the portion of the design to be positioned on the workpiece.

13. The method of claim 11; the computer including a pattern of elements of the workpiece; the device further including: user input means in communication with said computer;

wherein the step of placing the base unit and workpiece at a known relative position and orientation comprises the steps of:

positioning the base unit within line of sight of the workpiece;

choosing a sufficient number of elements from the pattern of the workpiece to determine the relative position and orientation of the base unit to the workpiece; and measuring each chosen element by:

on the user input means, indicating the chosen element from the pattern to the computer;

positioning the cable free end on the chosen element; and on the user input means, directing the computer to associate the cable signal and the first carriage signal with location of the chosen element.

14. The method of claim 13, the incoming cable passage including: pitch measuring means for measuring the angle or change of angle of said cable in a plane parallel to the first axis and for producing a pitch signal indicative thereof; further comprising the step of:

on the user input means, further directing the computer to associate the pitch signal with the location of the chosen point.

15. A positioning device for positioning a portion of a design on a workpiece comprising:

a cable including:
  a supply end;
  a midsection; and
  a free end for placement by a user;

a base unit having a known position and orientation relative to the workpiece including:
  a base;
  a first carriage rotationally attached to said base so as to be rotatable about a first axis;
  a second carriage rotationally attached to said first carriage so as to be rotatable about a second axis;
  a main datum passage attached to said second carriage for confined passage of said midsection of said cable;
  an angular displacement sensor assembly attached to said second carriage including:
    an incoming cable passage assembly defining an incoming datum passage between said main datum passage and said cable free end for confined passage of said midsection of said cable; said cable being in an alignment position when the local longitudinal axis of said cable in said incoming datum passage is aligned with said main datum passage; said device being in the target position when said incoming datum passage and said main datum passage are aligned with the portion of the design; said angular displacement sensor assembly for sensing angular displacement of said cable away from the alignment position and for producing a displacement signal indicative thereof;
  a first motor coupled to said first carriage for rotating said first carriage about the first axis;
  a second motor coupled to said second carriage for rotating said second carriage about the second axis;
  first carriage measuring means on said base unit for measuring the rotational position or change of rotational position of said first carriage relative to said base and for producing a first carriage signal indicative thereof; and
  second carriage measuring means attached to said base unit for measuring the rotational position or change of rotational position of said second carriage relative to said first carriage and for producing a second carriage signal indicative thereof;
  cable measuring means attached to said base unit and coupled to said cable for measuring the length or change of length of said cable and for producing a cable signal indicative thereof; and a cable tensioning motor attached to said base unit for adjusting the force required to move said cable free end away from said base unit;

cable direction means for directing a user to move said cable free end toward the position of the portion of the design on the workpiece; and a computer including a program and memory including the design; wherein said device has an output mode for positioning the portion of the design on a workpiece wherein:

said computer is programmed: responsive to the first carriage signal and the second carriage signal, for instructing said first motor and second motor to rotate said first carriage and said second carriage to the target position;

responsive to said cable signal from said cable measuring means, for directing said cable tensioning motor to adjust the tension in said cable sufficiently to indicate when cable free end is at a distance to the portion of the design;

responsive to the displacement signal from said angular displacement sensor, for directing said cable direction means to direct the user to move said cable free end toward the portion of the design.

16. The device of claim 15 further including user input means in communication with said computer for selecting the portion of the design to be positioned on the workpiece.

17. The positioning device of claim 15:

said computer including a pattern of the workpiece;

said device having an input mode for determining the relative position and orientation of said base unit relative to the workpiece by measuring the relative location on the workpiece of a point or points from the pattern of the workpiece, wherein, for each design point being measured upon which the user places said cable free end:

said first motor rotates said first carriage about the first axis responsive to the displacement signal from said angular displacement sensor assembly indicative of cable displacement about the first axis and said second motor rotates said second carriage about the second axis responsive to the displacement signal from said angular displacement sensor assembly indicative of cable displacement about the second axis so as align said incoming datum passage and said main datum passage with the point; and said computer means receives the cable signal, the first carriage signal, and the second carriage signal for determining the relative position of the point being measured.

18. A method for determining the position of a portion of a design on a workpiece with a positioning device comprising: a cable including: a supply end; a midsection; and a free end for placement by a user; a base unit having a known position and orientation relative to the workpiece including: a base; a first carriage rotationally attached to the base so as to be rotatable about a first axis; a second carriage rotationally attached to the first carriage so as to be rotatable about a second axis; a main datum passage attached to the second carriage for confined passage of the midsection of the cable; an angular displacement sensor assembly attached to the second carriage including: an incoming cable passage assembly defining an incoming datum passage between the main datum passage and the cable free end for confined passage of the midsection of the cable; the cable being in an alignment position when the local longitudinal axis of the cable in the incoming datum passage is aligned with the main datum passage; the device being in the target position when the incoming datum passage and the main datum passage are aligned with the portion of the design; the angular displacement sensor assembly for sensing angular displacement of the cable away from the alignment position and for producing a displacement signal indicative thereof; a first motor coupled to the first carriage for rotating the first carriage about the first axis; a second motor coupled to the second carriage for rotating the second carriage about the second axis; first carriage measuring means on the base unit for measuring the rotational position or change of rotational position of the first carriage relative to the base and for producing a first carriage signal indicative thereof; second carriage measuring means attached to the base unit for measuring the rotational position or change of rotational position of the second carriage relative to the first carriage and for producing a second carriage signal indicative thereof; cable measuring means attached to the base unit and coupled to the cable for measuring the length or change of length of the cable and for producing a cable signal indicative thereof; and a cable tensioning motor attached to the base unit for adjusting the force required to move the cable free end away from the base unit; cable direction means for directing a user to move the cable free end toward the position of the portion of the design on the workpiece; and a computer including a program and memory including the design; wherein said device has an output mode for positioning the portion of the design on a workpiece wherein: the computer is programmed: responsive to the first carriage signal and the second carriage signal, for instructing said first motor and second motor to rotate said first carriage and said second carriage to the target position; responsive to the cable signal from the cable measuring, for directing the tension adjustment means to adjust the tension in the cable sufficiently to indicate when cable free end is at a distance to the portion of the design; responsive to the displacement signal from the angular displacement sensor, for directing the cable direction means to direct the user to move the cable free end toward the portion of the design; the method comprising the steps of:

placing the base unit and workpiece at a known relative position and orientation;

responsive to the cable direction means, moving the cable free end until the cable direction means indicates that the cable is in alignment position; and moving the cable free end radially to a point of cable tension adjustment indicative that the free end is at a distance to the portion of the design.

19. The method of claim 18 wherein the device further includes user input means in communication with said computer; and further including the step of:

selecting the portion of the design to be positioned on the workpiece using the user input means.

20. The method of claim 18 wherein:

the computer includes a pattern comprised of elements of the workpiece; and the device includes: user input means in communication with said computer; the device having an input mode for determining the relative position and orientation of the base unit relative to the workpiece by measuring the relative location on the workpiece of an element from the pattern of the workpiece, wherein, for each design point being measured upon which the user places the cable free end: the first motor rotates the first carriage about the first axis responsive to the displacement signal from the angular displacement sensor assembly indicative of cable displacement about the first axis and the second motor rotates the second carriage about the second axis responsive to the displacement signal from the angular displacement sensor assembly indicative of cable displacement about the second axis so as align the incoming datum passage and the main datum passage with the point; and the computer means receives the cable signal, the first carriage signal, and the second carriage signal for determining the relative position of the point being measured; wherein the step of placing the base unit and workpiece at a known relative position and orientation comprises the steps of:

positioning the base unit and workpiece in line of sight;

placing the device in input mode;

with the user input means, choosing a sufficient number of elements from the pattern of the workpiece to determine the relative position and orientation of the base unit to the workpiece; and measuring each chosen element by:
- on the user input means, indicating the chosen element from the pattern to the computer;
- positioning the cable free end on the chosen element; and
- on the user input means, directing the computer to associate the measurements from the cable measuring means, the first carriage measuring means, and the second carriage measuring means with the chosen element.

21. A positioning device for positioning a portion of a design on a workpiece comprising:
  a cable including:
    a supply end;
    a midsection; and
    a free end for placement by a user;
  a base unit having a known position and orientation relative to the workpiece including:
    a base;
    a first carriage rotationally attached to said base so as to be rotatable about a first axis including:
      a main datum passage attached to said first carriage for confined passage of said midsection of said cable;
      an angular displacement sensor assembly attached to said first carriage including:
        an incoming cable passage assembly including:
          an incoming datum passage between said main datum passage and said cable free end for confined passage of said midsection of said cable; said cable being in an alignment position when the local longitudinal axis of said cable in said incoming datum passage is aligned with said main datum passage; said device being in the target position when said incoming datum passage and said main datum passage are radially aligned with the portion of the design; said angular displacement sensor assembly for sensing angular displacement of said cable away from the alignment position and for producing a displacement signal indicative thereof;
    a first motor coupled to said first carriage for rotating said first carriage about the first axis;
    first carriage measuring means on said base unit for measuring the rotational position or change of rotational position of said first carriage relative to said base and for producing a first carriage signal indicative thereof;
    cable measuring means attached to said base unit and coupled to said cable for measuring the length or change of length of said cable and for producing a cable signal indicative thereof; and
    a cable tensioning motor attached to said base unit for adjusting the force required to move said cable free end away from said base unit;
  cable direction means for directing a user to move said cable free end toward the portion of the design on the workpiece; and
  a computer including a program and memory including the design; wherein said device has an output mode for positioning the portion of the design on a workpiece; wherein:
  said computer is programmed, responsive to the first carriage signal from said first carriage measuring means, for directing said cable direction means to direct the user to move said cable free end toward the selected design portion and, responsive to the cable signal, for directing said cable tensioning motor to adjust the tension in said cable sufficiently to indicate when said cable free end is at the distance to the portion of the design; and said first motor rotates said first carriage, responsive to the displacement signal from said angular displacement sensor, to follow user movement of said cable free end.

22. A positioning device for positioning a portion of a design on a workpiece comprising:
  a cable including:
    a supply end;
    a midsection; and
    a free end for placement by a user;
  a base unit having a known position and orientation relative to the workpiece including:
    a base;
    a first carriage rotationally attached to said base so as to be rotatable about a first axis;
    a second carriage rotationally attached to said first carriage so as to be rotatable about a second axis;
    a main datum passage attached to said second carriage for confined passage of said midsection of said cable;
    an angular displacement sensor assembly attached to said second carriage including:
      an incoming cable passage assembly defining an incoming datum passage between said main datum passage and said cable free end for confined passage of said midsection of said cable; said cable being in an alignment position when the local longitudinal axis of said cable in said incoming datum passage is aligned with said main datum passage; said device being in the target position when said incoming datum passage and said main datum passage are aligned with the portion of the design; said angular displacement sensor assembly for sensing angular displacement of said cable away from the alignment position and for producing a displacement signal indicative thereof;
    a first motor coupled to said first carriage for rotating said first carriage about the first axis;
    a second motor coupled to said second carriage for rotating said second carriage about the second axis;
    first carriage measuring means on said base unit for measuring the rotational position or change of rotational position of said first carriage relative to said base and for producing a first carriage signal indicative thereof; and
    second carriage measuring means attached to said base unit for measuring the rotational position or change of rotational position of said second carriage relative to said first carriage and for producing a second carriage signal indicative thereof;

cable measuring means attached to said base unit and coupled to said cable for measuring the length or change of length of said cable and for producing a cable signal indicative thereof; and a cable tensioning motor attached to said base unit for adjusting the force required to move said cable free end away from said base unit;

cable direction means for directing a user to move said cable free end toward the position of the portion of the design on the workpiece; and a computer including a program and memory including the design; wherein said device has an output mode for positioning the portion of the design on a workpiece; wherein:

said computer is programmed, responsive to first carriage signal and the second carriage signal, for directing said cable direction means to direct the user to move said cable free end toward the selected design portion, and, responsive to the cable signal, for directing said cable tensioning motor to adjust the tension in said cable sufficiently to indicate when said cable free end is at the distance to the portion of the design; and, responsive to the displacement signal from said angular displacement sensor, said first motor rotates said first carriage and said second motor rotates said second carriage to follow user movement of said cable free end.

* * * * *